(12) United States Patent
Mohanty et al.

(10) Patent No.: US 9,633,403 B2
(45) Date of Patent: Apr. 25, 2017

(54) MANAGING SUSTAINABLE INTELLECTUAL PROPERTY PORTFOLIO OF AN ENTERPRISE

(71) Applicant: Tata Consultancy Services Limited, Mumbai, Maharashtra (IN)

(72) Inventors: Santosh Kumar Mohanty, Maharashtra (IN); Shampa Sarkar, Maharashtra (IN); Taruna Gupta, Maharashtra (IN)

(73) Assignee: Tata Consultancy Services Limited, Mumbai (IN)

( * ) Notice: Subject to any disclaimer, the term of this patent is extended or adjusted under 35 U.S.C. 154(b) by 974 days.

(21) Appl. No.: 13/927,591

(22) Filed: Jun. 26, 2013

(65) Prior Publication Data
US 2014/0279690 A1    Sep. 18, 2014

(30) Foreign Application Priority Data
Mar. 15, 2013  (IN) ........................... 809/MUM/2013

(51) Int. Cl.
*G06Q 50/18* (2012.01)
*G06Q 40/06* (2012.01)

(52) U.S. Cl.
CPC ........... *G06Q 50/184* (2013.01); *G06Q 40/06* (2013.01)

(58) Field of Classification Search
CPC .............................. G06Q 50/184; G06Q 40/06
USPC ... 705/1.1, 80, 300–318, 329, 342–348, 500
See application file for complete search history.

(56) References Cited

U.S. PATENT DOCUMENTS

| 8,145,639 | B2  | 3/2012 | Williams |
| 8,145,640 | B2  | 3/2012 | Williams |
| 8,161,049 | B2  | 4/2012 | Williams |
| 8,380,548 | B2* | 2/2013 | Ng .................. G06Q 10/06375 705/1.1 |

(Continued)

FOREIGN PATENT DOCUMENTS

EP        1182578 A1    2/2002

OTHER PUBLICATIONS

Atomicity Definition.*

(Continued)

*Primary Examiner* — Aryan Weisenfeld
(74) *Attorney, Agent, or Firm* — Banner & Witcoff, Ltd.

(57) ABSTRACT

The present subject matter describes a method and a system for managing sustainable intellectual property (SIP) portfolio of an Enterprise, which comprises generating, by a processor, a sustainable intellectual property (IP) in atomicity of the Enterprise based on a set of sustainability differentiators. The sustainability differentiator is obtained, based on at least one of a strength parameter, a spread parameter, a duplicity parameter, and a difference parameter Further, a plurality of decomposed fragments of intellectual property landscapes are obtained by analyzing the sustainable IP in atomicity based on a plurality of intermediate datasets and data structures. The method further comprises creating a sustainable and optimized IP portfolio for the Enterprise by processing at least one of the sustainable IP in atomicity and the plurality of decomposed fragments based on optimization parameters and at least one multiple objective portfolio optimization function. An integrated system is developed that enables the method in totality.

13 Claims, 20 Drawing Sheets

(56) References Cited

U.S. PATENT DOCUMENTS

| | | | |
|---|---|---|---|
| 2004/0044688 A1 | 3/2004 | Brudz et al. | |
| 2007/0174039 A1 | 7/2007 | Lin et al. | |
| 2008/0313001 A1 | 12/2008 | Marko et al. | |
| 2009/0019355 A1* | 1/2009 | Jiang | G06Q 10/10 715/227 |
| 2009/0228518 A2 | 9/2009 | Wallace et al. | |
| 2010/0332285 A1* | 12/2010 | Dunagan | G06Q 10/06 705/7.37 |
| 2013/0238513 A1* | 9/2013 | Mohanty | G06Q 10/0633 705/310 |

OTHER PUBLICATIONS

Large Patent Portfolio Optimization, Author:Heli Orelma (Helsinki University of Technology) Published on: Sep. 17, 2007, 105 pages.
IRunway, Unearth new opportunities by changing the way you look at patents in your portfolio, Feb. 26, 2013, www.i-runway.com/litigation-services/portfolio-analysis, html, 2 pages.

* cited by examiner

MANAGING SUSTAINABLE INTELLECTUAL PROPERTY PORTFOLIO OF AN ENTERPRISE

TECHNICAL FIELD

The present subject matter relates, in general, to sustainable intellectual property portfolio (SIP) management and, in particular, to systems and methods for managing SIP of an Enterprise.

BACKGROUND

Intellectual Property (IP) assets have been recognized as the currency of next generation trade and the key factor contributing to an Enterprise's growth and sustainability. The trade is valued by sharp IP Portfolios, whose sustenance, disruptiveness and alignment to business rank an Enterprise's capability towards top-notch IP led offerings and to process the freedom to operate in a definite marketplace.

Thus, management of Intellectual Property is becoming increasingly crucial and globally, it has been observed that 80-85% of the market capitalization of the S&P 500 companies is attributable to the IP assets cutting across all technology and business sectors. Trends also show that the proportion of value derived from IP assets has changed significantly over the last three decades, wherein IP's contribution to market capitalization has consistently being increased from 17% in 1975 to its current levels. Global trends also show with convergence that the trade related aspects of IP lies not in its individual worth, but in a strategically designed, optimally aggregated and well managed IP portfolio which offers scale, diversity and synergy related advantages.

An IP portfolio of an Enterprise may be understood as a set of multi-objective clusters of its standalone patents or a set of patents, being appropriately inter-linked, positioned and self-optimized with respect to technology, time sustainability, and focused business area. Hence, analogous to the general theory of modern portfolio optimization for financial instruments, optimization of the IP portfolio is a problem involving complex decision support methodologies used to ensure that the IP in the Enterprise adds or gains business value, and simultaneously is well-protected against any risk of litigation and changes in business environment. Further, uncertain valuation of standalone patents, proliferated nature of technology and the necessity to integrate various aspects, like synergy and business strategy alignment, may pose various problems while managing the IP portfolio.

Many global innovative companies have built their own Portfolio model(s) being synchronized with their growth and predicted business initiatives. The Enterprise needs to be IP sustainable from a firm base of grass root level, wherein each standalone IP should be matured in a sustainable and optimized manner. Creation of a sustainable IP base can then only lead to a sustainable and optimized IP Portfolio and can further lead to a sustainable patent/portfolio led offerings.

SUMMARY

This summary is provided to introduce concepts related to systems and methods of managing a sustainable intellectual property portfolio (SIP) of an Enterprise and the concepts are further described below in the detailed description. This summary is neither intended to identify essential features of the claimed subject matter nor is it intended for use in determining or limiting the scope of the claimed subject matter.

In one implementation, the present subject matter describes a method and a system for managing sustainable intellectual property (SIP) portfolio of an Enterprise, which comprises generating, by a processor, a sustainable intellectual property (IP) in atomicity of the Enterprise based on a set of sustainability differentiators. The set of sustainability differentiators is obtained, based on at least one of a strength parameter, a spread parameter, a duplicity parameter, and a difference parameter. Further, a plurality of decomposed fragments of intellectual property landscapes are obtained by analyzing the sustainable IP in atomicity based on a plurality of intermediate datasets and data structures. The method further comprises creating, by the processor, a sustainable and optimized IP portfolio for the Enterprise by processing at least one of the sustainable IP in atomicity and the plurality of decomposed fragments based on optimization parameters and at least one multiple objective portfolio optimization function.

BRIEF DESCRIPTION OF THE DRAWINGS

Further objects, embodiments, features and advantages of the present subject matter will be more apparent when read together with the detailed description and accompanied drawings. The objective of the drawings included herein is to lay more emphasis on understanding the underlying principle of the present subject matter. The manner in which the drawings are presented in no way limit the scope of the present subject matter and the advantages one can garner from the embodiments of the present subject matter.

The detailed description is described with reference to the accompanying figures. In the figures, the left-most digit(s) of a reference number identifies the figure in which the reference number first appears. The same numbers are used throughout the drawings to reference like features and components.

FIG. 5 illustrating schematics of a Patent Landscape, according to an embodiment of the present subject matter.

DETAILED DESCRIPTION

Figure 1:
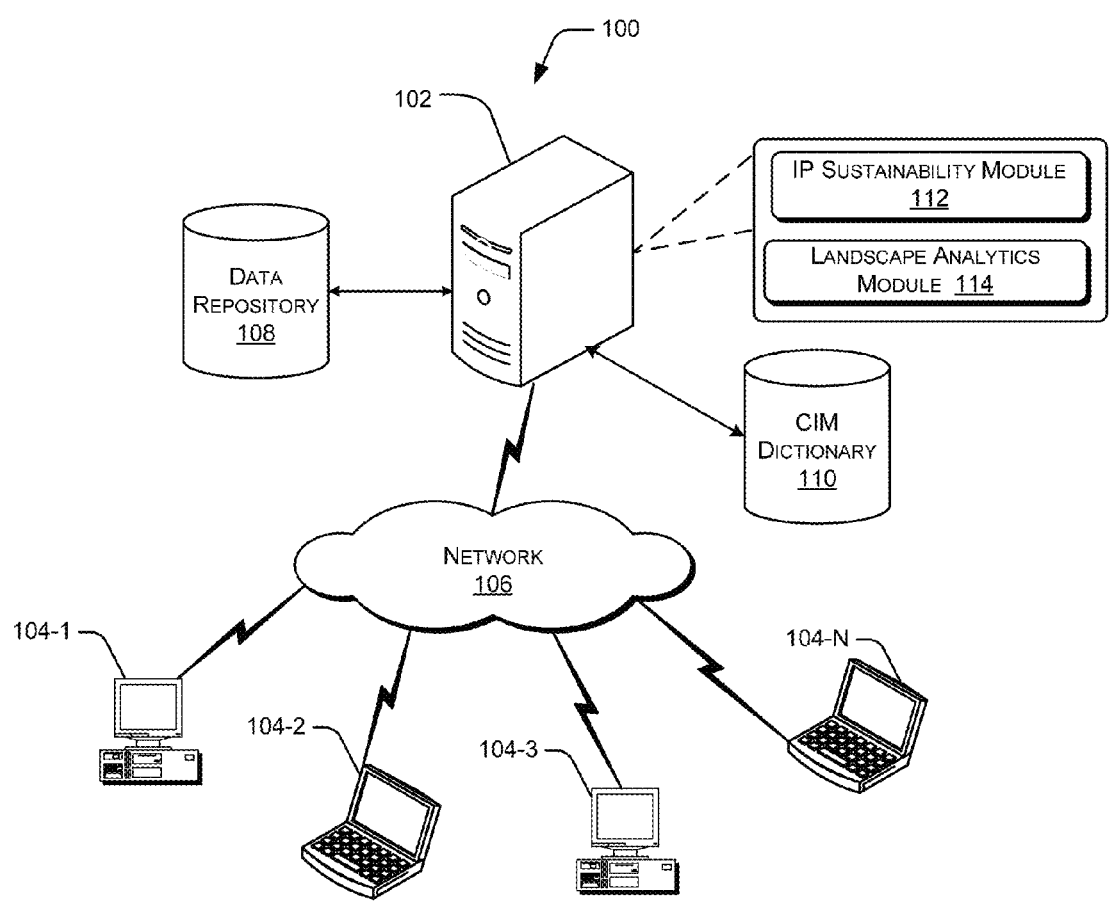
FIG. 1 illustrates a network environment implementing a sustainable intellectual property portfolio (SIP) management system, according to an embodiment of the present subject matter.

Systems and methods for managing a sustainable intellectual property portfolio (SIP) of an Enterprise are described herein. The systems and methods can be implemented in a variety of computing systems. Examples of such computing systems include, but are not restricted to, mainframe computers, workstations, personal computers, desktop computers, minicomputers, servers, multiprocessor systems, laptops, network servers, and the like.

Generally, it is desirable that the Intellectual property portfolio of an Enterprise enables highest return on investment with least risk under the constraints of risk tolerance and diversification of investments in dynamic IP asset sets. An Enterprise thus would try to create a strong base of sustainable IP in atomicity IP, enabling minimizing in the uncertainty in valuation and legal risk of standalone patents. Generally, most of the global innovative companies build their own portfolio model(s) that are synchronized with their growth and predicted business initiatives. Yet, these portfolio development and management models are still far from being able to create value-adding IP in a focused and structured manner to maximize the returns on investment and minimize associated risks. Consequently, the field of IP portfolio management and associated IP portfolio optimization remains enormously challenging, and continuously evolving with newer models and frameworks.

The present subject matter describes systems and methods for managing sustainable intellectual property (SIP) of an Enterprise. It should be appreciated by those skilled in the art that though the systems and methods for managing the SIP are described in the context of managing the SIP of an Enterprise, the same should not be construed as a limitation.

In a large Enterprise, the intellectual property is spread out across different business units, technologies, products, engineering and service groups and a sustainable Enterprise may develop certain Enterprise Capabilities to manage certain classes of Enterprise services. When in an Enterprise (E), a new idea results in an invention within a defined technology subject area (A), the invention or patent ($P_N$) is aimed at getting added to an existing IP portfolio or a newly formed IP Portfolio of the Enterprise (E). Other Enterprises or organizations or groups of individuals or any single entity who are active in the same area A form the group of stakeholders (other than E), who may have pre-existing IP footprints in A, and are referred to as key players (K). The key players may gather distinct viewpoints towards any change in the IP scope in A, based on their interest. Thus, multiple viewpoints may stem from multiple activities being undertaken by K in the dynamic landscape of A with the objective to compete, sell, merge, acquire, increase growth through R&D, etc.

Hence, as the IP dataset of the key players, $K^{IP}$, is continuously evolving, it may be possible to only know the dataset $K^{IP}$ maximally or optimally in A. Knowing the dataset $K^{IP}$, a sustainable Enterprise E will have the strategic desire to impart cutting-edge IP benefit ($\delta$) in $P_N$ in the technology area A over $K^{IP}$ by its R&D initiatives, innovation programs and business leads so as to strengthening and spreading its footprint. The IP cutting-edge benefit $\delta$ is also referred to as a sustainability differentiator. The IP scenario, after identification of the sustainability differentiator IP, is illustrated in Equation 1 and Equation 2 at a given time context.

$$E^{IP} \rightarrow E^{IP} + \delta \qquad \text{Equation 1}$$

$$K^{IP} \approx K^{IP} \qquad \text{Equation 2}$$

($\approx$ symbolizes that there may be some changes in $K^{IP}$ which is still not known in the public domain.)

Hence, to build a SIP portfolio management, strategic decisions have to be made towards enhancing the sustainability of the IP or patent $P_N$ related to the Enterprise's existing IP portfolio $E^{IP}$, existing key player IP $K^{IP}$ and, more particularly, enhancing the 'sustainability of the claims' of $P_N$, such that it strengthens the Enterprise's IP footprint in A and also subsequently enhances the sustainability of the Enterprise's IP portfolio to which it belongs.

The term 'Sustainability of a claim' of a patent may have bi-fold implications, namely, a claim should possess capability of long term sustenance (which may comprise business sustenance) and a claim should perform technological advancement either by deepening the subject area or by widening around it.

In one implementation, a SIP management method and system of the present subject matter ensures the sustainability of the intellectual property by maintaining autonomous and gradual progression of sustainable Intellectual Property management from the grass-root level sustainable IP in atomicity to its subsequent development into sustainable Enterprise IP Portfolio. The grass-root level sustainable IP in atomicity may further lead to the sustainable IP led offering. Thus, the design of SIP System is based on a 'bottom-up approach'.

In one implementation, the SIP management method and system may create a Digital IP genome in a Digital format for each of the claim element in a potential patent for the invention. The potential patent may be defined as a patent or invention being added or is getting added to the SIP of an Enterprise. The Digital IP genome may include information about the patent, such as a domicile, a claim element index, a collaborative invention mining (CIM) genome, and other genome. The Digital IP genome being obtained for each claim element may be then aggregated to obtain a Digital IP genome set.

Once the Digital IP genome set is obtained, thereafter, a set of sustainability differentiators δ may be identified based on at least one parameter. The at least one parameter may include Strength, Spread, Duplicity and Difference, whose cardinality may determine the footprint of the invention. The Strength may be defined as a measure of capability of the claim element to create new or incremental in-depth protection or defense to the patent as compared to earlier aggregated claim elements of the patents of the Enterprise and key players. Similarly, the Spread may be defined as a measure of capability of the claim element to widen the fencing of the patent as compared to earlier aggregated claim elements of the patents of the Enterprise and the key players. The Duplicity parameter, as the name suggests, is defined to identify duplicate claim elements, i.e., claim elements that do not add capability towards the Strength or the Spread and hence, need to be removed before the next iteration of claims construct. The Difference parameter may comprise a strong difference, a distributed difference and a fuzzy difference is described later.

In one implementation, the footprint may be determined by leveraging an improvised Collaborative Invention Mining (CIM) framework. The CIM framework may provide a comparison matrix, a competitive matrix, a topological matrix, and a difference matrix. The comparison matrix may be used for claims analysis towards the Strength, the Spread, and the Duplicity cardinality determination or enhancement for a new standalone invention or patent in comparison with the previous patents filed by the Enterprise in the same technological subject area. Similarly, the competitive matrix and the topology matrix are used for claims analysis towards the Strength, the Spread and the Duplicity cardinality determination of patents from the key players and from a single key player respectively, in the global marketplace in the same technological subject area. The difference matrix may be used for the claims differentiation between at least one of the inventions $P_N$, the comparison matrix and the competitive matrix dataset. Further, the comparison matrix and the difference matrix may be analyzed to obtain a sustainable claims set and a competitive advantageous claims set, respectively. In one implementation, the set of sustainability differentiators may be obtained based on the sustainable claims set and the competitive advantageous claims set.

A sustainability differentiator in the set of sustainability differentiators may further help in identifying weak links or areas, which can be scoped further for strengthening or spreading by innovation or improvising around such areas. The rationalization imparts sustainability in a new patent application $P_N$ as well as organizes the Enterprise's IP creation process by the SIP model driven 'IP Sustainability (IPS)' approach. Moreover, based on the set of sustainability differentiators, the SIP management system may identify the claim elements of the $P_N$ as a potential source of weak links or gap in the fence of the $P_N$, which the key player may target to penetrate in the defense of the $E^{IP}$.

Further, the SIP management method and system may determine IP landscapes to depict one or more IP holding patterns pertaining to the SIP of the Enterprise. The IP landscapes are based on at least one of the strength, the spread, the duplicity and the difference parameter and cardinality of the sustainable IP in atomicity of an Enterprise and the corresponding Comparison matrix, Competitive matrix, Topology matrix and Difference matrix and fall under the intermediate level of the multi-tiered SIP management. The patterns may include patent maps, active key player based map, growth and synergy related patent maps and indicative trend analysis. These maps can be obtained by creating a number of intermediate datasets, which can be considered as a plurality of decomposed fragments or partial visualization of the IP landscapes in entirety. With the base of sustainable IP in atomicity and the following intermediate level datasets, the SIP management method may bifurcate into two different Enterprise capabilities and services: optimization of Enterprise IP portfolio and portfolio-led offering of the Enterprise in a select set of marketplace.

In one implementation, the SIP management method and system may create a sustainable and optimized IP portfolio based on at least one of the sustainable IP in atomicity data or a plurality of decomposed fragments of the IP landscapes. For creating the sustainable and optimized IP portfolio, the SIP management method employs a decision support methodology of screening patents and compatible key players matching criteria based on an Identify-Analyze-Position model sequence. The Identify-Analyze-Position model sequence ensures that the patent portfolio meets the multi-dimensional objectives that include maximizing the total value of the portfolio and minimizing the risk to the portfolio, simultaneously. The Identify-Analyze-Position model incorporates competition and interplay between diversification and correlation of IP assets towards positioning the Enterprise for scenarios encompassing various strategies, such as promoting, flooding, fencing, strengthening, surrounding, and patent networking strategies.

The SIP management method and system may further support analytical models and optimization approach related to the portfolio-led offerings of the Enterprise, whose root also lies in the sustainable IP in atomicity tier. However, the dataset selection and clustering therein are constrained by certain preconfigured filters, which may comprise a time filter, a space filter and an assignee or ownership filter. The associated methodology and algorithms towards 'Sustainable Enterprise Offering' (SEO) in a select set of marketplace may thus be designed on the offering's unique Feature-Capability linked list.

Thus, the method and system for managing the SIP in an Enterprise facilitate the optimization of the patent portfolio and determination of the sustainability of portfolio-led offering of the Enterprise. The present subject matter uses methodologies and systems to handle a large number of IPs and associated IP landscapes. Further, the SIP management method and system facilitates automation of the claim analysis by creating the Digital genome set and uses genetic algorithm based techniques to compare the IP to $E^{IP}$ and $K^{IP}$. The SIP management method and system combines granular analysis at claim element level and macro analysis at product and patent portfolio level for efficient management of the sustainable intellectual property. These and other features of the present subject matter would be described in greater detail in conjunction with the following figures. While aspects of described systems and methods for the quality monitoring can be implemented in any number of different computing systems, environments, and/or configurations, the embodiments are described in the context of the following exemplary system(s).

FIG. 1 illustrates a network environment 100 implementing a sustainable intellectual property portfolio (SIP) management system 102, according to an embodiment of the present subject matter. In said embodiment, the network environment 100 includes the SIP management system 102 (hereinafter referred to as the system 102) configured for managing the SIP in an Enterprise. In one implementation, the system 102 may be included within an existing information technology infrastructure or an existing intellectual property management system of an Enterprise. For example, system 102 may be interfaced with the existing content and document management system(s), database and file management system(s), of the Enterprise.

The system 102 may be implemented in a variety of computing systems, such as a laptop computer, a desktop computer, a notebook, a workstation, a mainframe computer, a server, a network server, and the like. It will be understood that the system 102 may be accessed by users through one or more user devices 104-1, 104-2, 104-3 . . . 104-N, collectively referred to as user devices 104. Examples of the user devices 104 include, but are not limited to, a desktop computer, a portable computer, a mobile phone, a handheld device, and a workstation. The user devices 104 may be used by various users in the Enterprise such as IP analysts, IP consultants, IP managers, various business, R&D and other program heads, inventors and system administrators. As shown in the figure, such user devices 104 are communicatively coupled to the system 102 through a network 106 for facilitating one or more users to access and use the system 102.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc.

In one implementation, the system 102 is communicatively coupled to a data repository 108, a claims parsing algorithm library, a claims pattern library, a claims ranking library and a collaborative invention mining (CIM) dictionary 110, either directly or through the network 106. The data repository 108 may store or provide access to various published patent applications, granted patents, prosecution and litigation history of the patent applications and granted patents, of various jurisdictions such as India, The United States of America, Europe, Great Britain, Japan, Australia, Korea, Republic of China and Australia. Further, the CIM dictionary 110 may include list of words which are used for claims parsing. These words may be selected based on context sensitive grammar. The context sensitive grammar may be used to create a context sensitive language. The Claims Parsing Algorithm Library comprises algorithms to perform the parsing program. The Claims Parsing Pattern Library comprises patterns for the purpose of parsing. The Claims Parsing Ranking Algorithm Library comprises ranking algorithm for the purpose of ranking the parsed data based on pre-configured matching and scoring criteria for at least one of a pattern matching and scoring criteria or a word matching and scoring criteria, wherein the said matching comprises matching pattern with respect to a reference pattern from the Claims Parsing Pattern Library and matching word with respect to a reference word in a reference dictionary wherein such reference dictionary comprises CIM Dictionary. Further, the data repository may comprise alpha-numeric data comprising at least one of a key player's intellectual property related discovery attribute set having at least one of assignee data, merger and acquisition data, news data, date data, jurisdiction related data, monetization data, valuation data, inventors related data, technology data, landscape data, business data, market data and standard or essential-patents related data. Further, the data repository may comprise various patent maps and indicative trend analytics related data and the data from the plurality of decomposed fragments of intellectual property landscapes obtained by analyzing a sustainable IP in atomicity. Further, the data repository may comprise comparison matrix, competitive matrix, topology matrix and difference matrix related data and a filtered set of the corresponding data therein, wherein the filter may comprise a date filter, a jurisdiction filter and an assignee or ownership filter.

In one embodiment, the system 102 includes an IP Sustainability (IPS) module 112 and a landscape analytics module 114. In said embodiment, the IPS module 112 may be configured to generate a Digital IP genome for each claim element of the claims in a potential patent $P_N$ to be added to portfolio of an Enterprise. The Digital IP genome may include information about the patent, such as a domicile, a claim element index, and a collaborative invention mining (CIM) genome, and other genome. The Digital IP genome obtained for each claim element may be then aggregated to obtain a Digital IP genome set for the patent $P_N$.

The IPS module 112 may parse the Digital IP genome set to obtain a set of sustainability differentiators based on at least one parameter. The at least one parameter may include Strength, Spread, and Duplicity, whose cardinality determine footprint of the invention. The IPS module 112 determines the at least one parameter based on a comparison with genome set of at least one of the Enterprise portfolio $E^{IP}$ and the key player portfolio $K^{IP}$. Thereafter, the IPS module 112 may leverage an improvised Collaborative Invention Mining (CIM) framework to identify the footprint of the new patent or invention. The IPS module 112 may obtain a difference matrix with the help of the CIM matrix. The IPS module 112 may obtain a difference matrix which may be used for claims differentiation between patent $P_N$ or comparison matrix and competitive matrix dataset. Thereafter, based on the set of sustainability differentiators, the IPS module 112 may obtain a sustainable IP in atomicity within the Enterprise.

In one implementation, the Landscape Analytics (LA) Module 114 may analyze the sustainable IP in atomicity for determining an IP landscape to analyze and illustrate one or more patterns pertaining to the SIP of the Enterprise. The patterns may include patent maps, active key player based map, growth and synergy related patent maps and indicative trend analysis, as will be explained later. The landscape analytics module 114 may be obtained the one or more patterns by creating a number of intermediate datasets and associated algorithms and by designing IP landscape comprising the strength, the spread, the duplicity and the difference parameters.

In one implementation, the SIP management system 102 may thereafter comprise modules supporting the bifurcated sustainable IP management process for optimizing the portfolio and obtaining or identifying sustainable portfolio-led offerings. The optimization and the identification are discussed in more detail in conjunction with FIG. 2.

Figure 2:
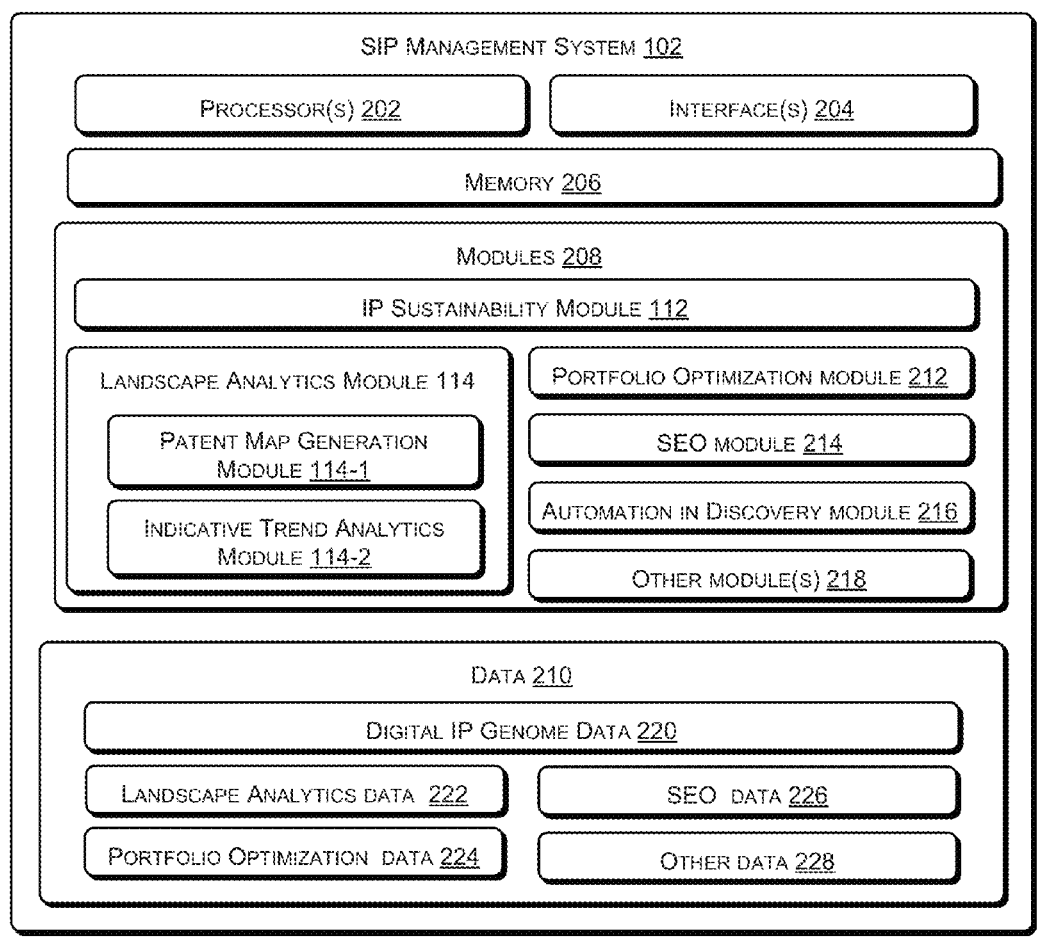
FIG. 2 illustrates the SIP management system, according to an embodiment of the present subject matter.

FIG. 2 illustrates the exemplary components of the patent management system 102, according to an embodiment of the present subject matter. In one embodiment, the patent management system 102 includes a processor(s) 202 interface(s) 204, and a memory 206. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 206.

The interface(s) 204 may include a variety of software and hardware interfaces, for example, a web interface, a graphical user interface, etc., allowing the patent management system 102 to interact with the user devices 104. Further, the interface(s) 204 may enable the system 102 to communicate with other computing devices, such as web servers and external data servers (not shown in figure). The interface(s) 204 can facilitate multiple communications within a wide variety of networks and protocol types, including wired networks, for example LAN, cable, etc., and wireless networks such as WLAN, cellular, or satellite. The interface(s) 204 may include one or more ports for connecting a number of devices to each other or to another server.

The memory 206 can include any computer-readable medium known in the art including, for example, volatile memory (e.g., RAM), and/or non-volatile memory (e.g., EPROM, flash memory, etc.). In one embodiment, the system 102 includes module(s) 208 and data 210. The module(s) 208 usually includes routines, programs, objects, components, data structure, etc., that perform particular task or implement particular abstract data types.

In one implementation, the modules 208 further include the IPS module 112, the Landscape Analytics (LA) module 114, a portfolio optimization module 212, a sustainable Enterprise offering (SEO) module 214, and an automation in discovery module 216. The modules 208 may also include other modules 218 for providing various other functionalities of the system 102. It will be appreciated that such modules may be represented as a single module or a combination of different modules. Additionally, the system 102 further includes data 210 that serves, amongst other things, as a repository for storing data fetched, processed, received and generated by one or more of the modules 208. In one implementation, the data 210 may include, for example, Digital IP genome data 220, landscape analytics data 222, portfolio optimization data 224, SEO data 226 and other data 228. In one embodiment, the data 210 may be stored in the memory 206 and/or the data repository 108 in the form of data structures. Additionally, the aforementioned data can be organized using data models, such as relational or hierarchical data models.

Figure 3:
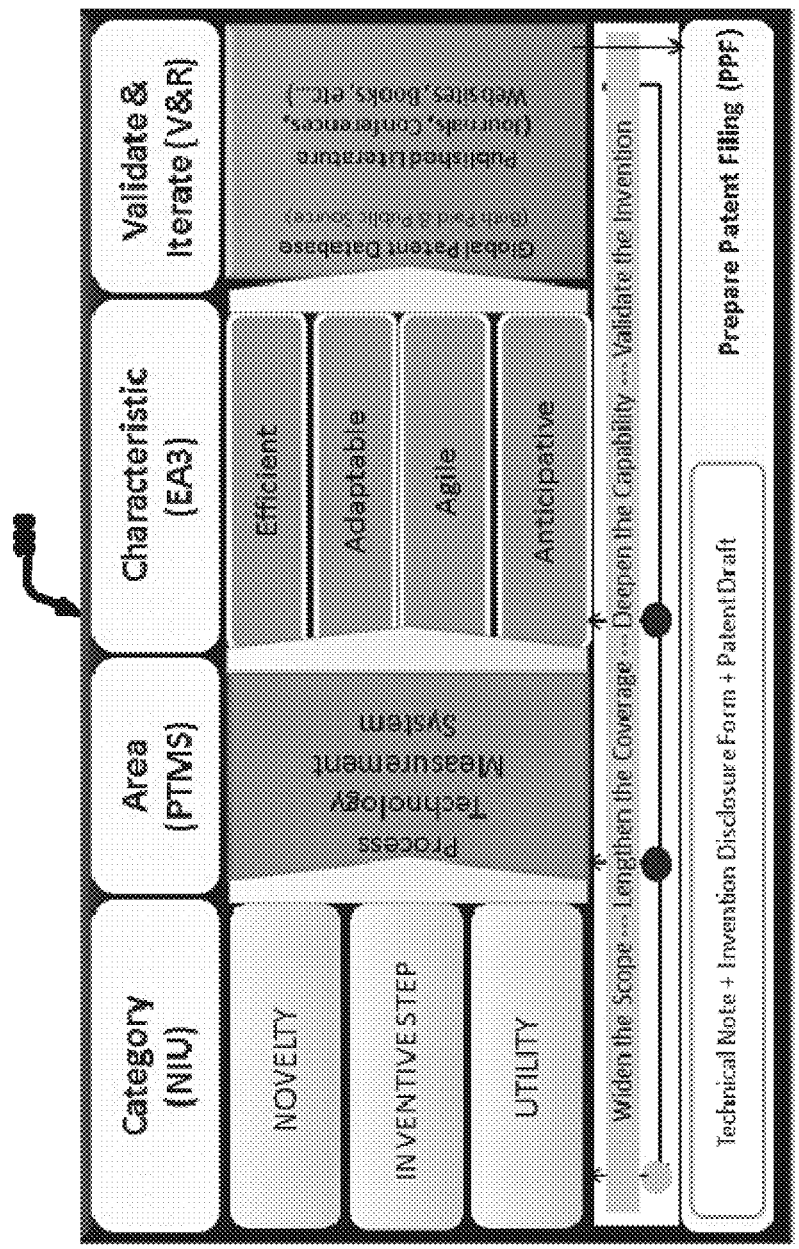
FIG. 3 illustrates a collaborative invention mining matrix, according to an embodiment of the present subject matter.

In one implementation, when a new patent or invention is added to an IP portfolio of an Enterprise, the IPS module 112 may determine a footprint of the invention by leveraging a collaborative invention mining matrix. FIG. 3 illustrates the collaborative invention mining matrix, according to an embodiment of the present subject matter. In order to carry out a structured claims analysis between the new patent $P_N$ in comparison to $E^{IP}$ and $K^{IP}$, the Collaborative Invention Mining (CIM) matrix 300 may be used. As shown in FIG. 3, the CIM matrix 300 facilitates the systematic transformation of an idea into a sustainable, patentable claims set for an invention, by imparting three-dimensional rigor towards Novelty (N), Inventive (I), and Utility (U) Category; Process (P), Technology (T), Measurement (M), System (S) Area; and EA3 (Efficient, Agile, Adaptable, Anticipative) Characteristic dimensions.

The CIM matrix 300 facilitates forming a structured Landscape, wherein the proposed claims of $P_N$ can be positioned, mapped and analyzed with respect to other existing claims, in terms of technological area and business characteristic dominance. As can be understood from FIG. 3, the CIM matrix 300, comprising Category, Area and Characteristics Dimensions, is orchestrated by a 48 (3×4×4) cell Idea Detailing Tree (IDT) matrix (NIU×PTMS×EA3), which facilitates mapping, clustering and visualization of ideation objects to yield structured claim elements with wider, broader and deeper scope. The IDT matrix further facilitates the construction of the Claim Tree diagram, as described below.

The NIU Category dimension defines the N, I and U blocks of the IDT matrix along which a set of idea elements/segments can be widened towards patentability scoping. Each of the claim segments in N, I and U categories can be further deliberated to lengthen the area coverage along Process, Technology, Measurement or System (PTMS) capabilities, which produces 12 cells (3×4) in the CIM matrix 300 for facilitating widening and lengthening scopes of the claim segments. Further, each of the claim elements in P, T, M and S area capabilities for each of N, I and U categories are scoped for deepening along Efficient, Adaptable, Agile and Anticipative (EA3) time sustenance characteristics, which produces 48 cells (12×4=3×4×4) of the IDT matrix. Thus in the IDT matrix, each claim element would occupy one cell based on where the claim element lies with reference to its best fitment to a particular category, area and characteristic.

Thereafter, the IPS module 112 may obtain a comparison matrix, a competitive matrix, a topology matrix, and a difference matrix based on the CIM matrix. The comparison matrix may be defined as a matrix in CIM matrices series where each cell is identical in design with respect to the CIM matrix, however, each cell claim element can further be categorized into one of three classes, viz., the strength, the spread, and the duplicity. The duplicity may further classified as one of strength duplicity and spread duplicity. The IPS module 112 may obtain the comparison CIM matrix (C_CIM) by sequential matrix addition of individual patent's CIM matrix. In the sequential matrix addition, each cell claim element of $\{CIM_{ijk}\}\_P_l$ is compared with the same cell claim elements of $\{C\_CIM_{ijk}\}\_[\Sigma_{l=1}^{N-1} P_l]$ and is classified into the strength, the spread and the duplicity. It is mentioned here that comparison matrix and comparison CIM matrix (C_CIM) imply the same subject matter and has been used interchangeably in the specification.

Figure 4:
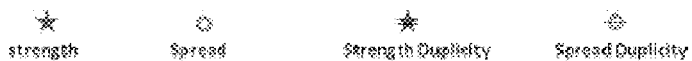
FIG. 4 depicts the snapshot of the Combined CIM matrix for $E^{IP}$, according to an embodiment of the present subject matter.

FIG. 4 depicts the snapshot of the Combined CIM matrix for $E^{IP}$ in a specific subject area A, according to an embodiment of the present subject matter. As shown in FIG. 4, symbols of star 402 and struck-out star 402 are for the strength and the strength duplicity, respectively. Further, symbols of a ring 406 and a struck-out ring 408 are for the spread and the spread duplicity, respectively. The individual claim statements can be analyzed using a pre-configured algorithm to determine whether each claim statement is contributing to the strength or spread of the patent. Further, it is also possible that some claim statements contributing to the strength or spread are duplicate ones and are indicated distinctly with a strikethrough for the purpose of easy elimination.

The competitive matrix (CO_CIM) may be defined as a matrix in CIM matrices series where the above logic of Comparative CIM matrix (claims) computation can be implemented with a similar algorithm. In one implementation, CO_CIM matrices are obtained for three scenarios. In a first scenario, the CO_CIM matrix may be obtained based on a comparison with the claim elements set of all active key players $\underline{K}^{IP}$ in the same technology area A. In a second scenario, the CO_CIM matrix may be obtained based on a comparison with the claims elements set of a selective set of key players $(\underline{K}^{IP})$, $\underline{K}^{IP} \neq \Phi$ and $\underline{K}^{IP} \subseteq \underline{K}^{IP}$. In a third scenario, the CO_CIM matrix may be obtained based on a comparison with a particular $K^{IP}$ comprising claims from only one key player, also referred to as a topology CIM Matrix or topology matrix. It is mentioned here that competitive matrix and competitive CIM matrix (CO_CIM) imply the same subject matter and has been used interchangeably in the specification.

The difference matrix is a matrix in CIM matrices series obtained by cell-by-cell claims element differentiation of $P_N$ and the competitive matrix for the same subject area A or the comparison matrix and the competitive matrix for the same subject area A, at any instant of time, as shown in Equation 3. Further, the difference matrix may also be used for obtaining following difference output, such as strong difference, distributed difference, and fuzzy difference.

$$D\_CIM_{ijk} = C\_CIM_{ijk} - CO\_CIM_{ijk} \forall (i,j,k), (i \in NIU, j \in PTMS, k \in EA3) \quad \text{Equation 3}$$

The strength parameter for a claim element in a cell of CIM matrix or the comparison based CIM matrices series denotes the claim element's capability to create new or incremental in-depth protection/defense to the patent compared to the earlier aggregated claims elements for that particular cell. Thus, when a claim element is identified as strength, it is considered to deepen the claimed capability and increase the aggregate strength of that particular cell's cross-correlational P/T/M/S area and EA3 characteristic, thereby creating a bend in the technology landscape.

The spread parameter for a claim element in a cell of CIM matrix or the comparison based CIM matrices series denotes the claim element's capability to widen the fencing territory (temporal and spatial) of the patent compared to the earlier aggregated claims elements for that particular cell. Thus, when a claim element is identified as spread, it is considered to widen the claimed capability and increase the aggregate spread of that particular cell's cross-correlational P/T/M/S area and EA3 characteristic, thereby, creating a stretch in the technology landscape.

The duplicity parameter for a claim element in a cell of a comparison based CIM matrix, such as the Comparison matrix, the Competitive matrix, and the Difference matrix denotes that the claim element duplicates the capability towards strength or spread of an existing claim element, and thus does not uniquely contribute to additional in-depth protection/defense or enhance the fencing territory of the patent as compared to the earlier aggregate claims elements for that particular cell.

In one implementation, for a given cell of a CIM matrix, the first entry has a higher potential to be strength, since it denotes that there is no existing claim element in that category, area and characteristic. For subsequent entries, metadata tagged attribute value comparison algorithm with key-value pair maybe used as one of the embodiments of the present subject matter to determine whether it is a strength entry or a spread entry. Further, for a Comparison matrix, Competitive matrix and Difference matrix, the entry can be any one of the type: a strength, a spread, a duplicity in strength or a duplicity in spread.

In one implementation, the IPS module 112 may determine the type of entry in the cell, i.e., the strength, the spread, and the duplicity, based on a predefined algorithm. For determining the entry, the IPS module 112 may generate a key-value pair for each entry with the entire claims element. For example, each claim element may be given by a key-value pair with the claim element as key and the value as some integer. Thereafter, the IPS module 112 may compare the keys of n-th entry with aggregated entries up to and including (n−1) by sequential comparison. In an example, the IPS module 112 may perform word by word comparison and metadata based comparison, such as synonyms, semantic, and ontology. In one of the embodiments, the metadata may be obtained from the CIM dictionary. Then the IPS module 112 performs scoring to determine the entry based on a matching analysis. According to the matching analysis, if matching score, based on percentage of matching words or metadata, is above the threshold value Dup_T, the IPS module 112 may determine the entry as a duplicate entry. In case, if the matching score is between the threshold values Dup_T and Sp_T, then the IPS module 112 may determine the entry as a spread entry. In case the matching score is below the threshold value Sp_T, then the IPS module 112 may determine the entry as a strength entry.

In one implementation, the IPS module 112 may compute the strength and the spread of claim elements based on claims cardinality. For example, a patent P1 has Cardinality of claims elements for a particular cell of CIM matrix be 4 out of which 3 are contributing to strength and 1 is contributing to spread. Further, a patent P2 has cardinality of claims elements for that same cell of the CIM matrix is 3 with 2 contributing to strength and 1 contributing to spread. While aggregating claim elements of P2 with claim elements of P1, strength elements of P2 for that particular cell can have 3 possibilities, viz., falls under strength class, spread class or duplicity class. While aggregating claim elements of P2 with claim elements of P1, spread elements of P2 for that particular cell can have two possibilities, viz., and falls under spread class or duplicity class.

In one implementation, if one of the strength elements of P2 (total strength elements=2) falls under strength class of the aggregate, but the other one is duplicate. Similarly, let the spread element of P2 contribute to the spread class of the aggregate and there is no duplicate. Hence the claim elements aggregation of both patents can be calculated by eliminating any duplicates from the sum of the two. In one implementation, the IPS module 112 may aggregate claims cardinality for the particular cell of CIM matrix=4+3−Duplicates=4+3−1=6. In one implementation, the IPS module 112 may aggregate strength cardinality for the particular cell of CIM matrix=3+2−1=4. In one implementation, the IPS module 112 may aggregate spread cardinality for the particular cell of CIM matrix=1+1−0=2.

Further, the IPS module 112 may generate the comparison CIM matrix, competitive CIM matrix and the difference CIM matrix. These matrixes may be further leveraged towards determining the sustainable claims set of the new invention $P_N$.

FIG. 5 illustrating schematics of a Patent Landscape, according to an embodiment of the present subject matter. As shown in FIG. 5, a disjoint view of $E^{IP}$ 502 against $K^{IP}$ 504 is projected for the same technological area A. In such a pre-existing landscape, a new patent $P_N$ is being added to an Enterprise's pre-existing active Patent Portfolio $E^{IP}$ (part of the Enterprise's larger intellectual property landscape), which is further compared with other patents in the Enterprise and later compared with prior art from the marketplace $K^{IP}$. The comparison is performed on the basis of strength, spread and duplicity to determine sustainability.

In one implementation, the $P_N$ is the new N-th patent application in the area A for the Enterprise. $P_1$ is the first patent application in the A. This naturally generates the corollary that the Enterprise has pre-existing active IP ($P_1$, $P_2 \ldots P_{N-1}$) in area A to which the $P_N$ is getting added. Thus, the Comparison matrix analysis helps to determine the sustainable claims set of $P_N$ in comparison with the aggregate claims set of aggregate $E^{IP}$ patents.

For the generation of the competitive CIM matrix, the IPS module 112 may develop the CIM matrix, the Boolean matrix and the CIM score for the new invention which will be developed as the $P_N$. The IPS module 112 may generate the CIM Matrix for $P_N$—referred as CIM{$P_N$} by leveraging the CIM IDT, which commences by filling up claim elements for the new invention $P_N$ in the 48 cell CIM matrix, by structuring the invention into the respective Category, Area and Business Characteristics. In one implementation, the IPS module 112 may generate a Boolean CIM Matrix for $P_N$, referred as Boolean_CIM{$P_N$}, which includes 1's and 0's for each of the CIM matrix cells for $P_N$ depending on occupancy/availability or non-occupancy/non-availability of claim elements in each cell. The IPS module 112 may generate the CIM Score for $P_N$—referred as Score_CIM{$P_N$}, wherein the Scoring algorithm has been preconfigured.

Thereafter, the IPS module 112 may perform a prior art search analysis to determine pre-existing IP of the Enterprise related to the invention $P_N$. In one implementation, the IPS module 112 may obtain the pre-existing IP from the data repository 108. In another implementation, the IPS module 112 may obtain the pre-existing IP of the Enterprise form a database of the Enterprise IP. The prior art search analysis may involve performing a thorough prior art search analysis from the Enterprise's own IP landscape $E^{IP}$ in the subject area A to determine the pre-existing IP. Once the pre-existing IP is determined, the claims of patent $P_N$ will be compared against the patents $P_1, P_2 \ldots P_{N-1}$ which form $E^{IP}$. Detailed steps of how to carry out the claim comparison are provided later.

Further, the IPS module 112 may perform the claim comparison between patents in the proposed model on the basis of determining the strength cardinality, the spread cardinality, the duplicity in either strength or spread and the corresponding Strength elements and Spread elements for any cell (i,k) for CIM{$P_{j_{(i,k)}}$}. As this can be valid for any cell (i,k) for CIM{$P_{N_{(i,k)}}$}, thus, various cardinality elements are obtained as shown below.

Cardinality of CIM Matrix for $P_N$=Card
[CIM{$P_N$}]= Total number of Elements for all the filled up Cells for CIM{$P_N$}.

Cardinality for Boolean_CIM{$P_N$}=Total number of filled up cells for CIM{$P_N$}=CIM_$B_N$.

Cardinality of strength_CIM{$P_{N_{(i,k)}}$}= strength_CIM{$P_{N_{(i,k)}}$}=Total elements belonging to Strength Class for the cell (i,k) for CIM{$P_N$}.

Cardinality of spread_CIM{$P_{N_{(i,k)}}$}=spread_CIM{$P_{N_{(i,k)}}$}= Total elements belonging to Spread Class for the cell (i,k) for CIM{$P_N$}

Cardinality[CIM{$P_N$}]=$\Sigma(i=1$ to 12; $k=1$ to 4)[strength_CIM{$P_{N_{(i,k)}}$}+spread_CIM{$P_{N_{(i,k)}}$}].

Thereafter, for the generation of the comparison CIM matrix, the Combined_CIM matrix (which is the same as Comparison Matrix for this scenario, C_CIM), Combined_Boolean matrix (same as Comparison CIM Boolean matrix), Combined_CIM score (same as Comparison CIM Score, generated by preconfigured Scoring mechanism with the input of Comparison_CIM matrix), Combined_Strength_CIM matrix (same as Comparison_Strength_CIM matrix) and Combined_Spread_CIM matrix (same as Comparison_S trength_CIM_matrix) for the aggregate IP of the Enterprise, in the area A are generated. The various cardinality elements of the comparison CIM matrix are listed below.

Cardinality of Comparison CIM Matrix=Card
[Comparison_CIM{$P_N$}]=Total number of Elements for all the filled up Cells for Comparison_CIM{$P_N$}.

Cardinality for Comparison_Boolean_CIM{$P_N$}=Total number of filled up cells for Comparison_CIM{$P_N$}=$\Sigma_{k=1}^{N}$CIM_$B_k$ Cardinality of comparison_strength_CIM{$P_{N_{(i,k)}}$}= comparison_strength_CIM{$P_{N_{(i,k)}}$}=Total elements belonging to Strength Class for the cell (i,k) for combined_CIM{$P_N$}

Cardinality of comparison_spread_CIM{$P_{N_{(i,k)}}$}=comparison_spread_CIM{$P_{N_{(i,k)}}$}=Total elements belonging to Spread Class for the cell (i,k) for CIM{$P_N$}

Further, it may be noted that the strength and the spread claim elements of the combined CIM matrix inherently possess two important characteristics: a Strength claim element may provide the time sequential growth/Gain of a particular technological subject area and a Spread claim element may provide related inter disciplinary field development, technology proliferations and synergy.

Thereafter, the IPS module 112 may generate a sustainable Claims set ($\sigma\_P_N$) for the invention $P_N$ utilizing the Comparison Matrix. Thus, the number of sustainable Claims set ($\sigma\_P_N$) for the invention $P_N$ can be given by Equation 4.

$$\sigma\_P_N \geq \text{Cardinality}\{\text{Strength}\}\_(P_N)_{Comparison} + \text{Cardinality}\{\text{Spread}\}\_(P_N)_{Comparison} \quad \text{Equation 4}$$

where, $(P_N)_{Comparison}$ may be defined as the claims elements of $P_N$ after comparing with Comparison matrix dataset, as some strength and spread claim elements of $P_N$ may become duplicity in strength and spread, after performing the Comparison matrix analysis.

The sustainable Claims set may comprise two parameters, viz., the 'Density enhancer' and 'Pushing Frontier', wherein the said parameters are obtained by comparing the prior existence of the Comparison matrix (of $P_N$) claims elements in the same cell (CIM) of $P_N$. Thus these parameters will be proportional to the Boolean difference (in Equation 4(a)) as $$\text{Boolean\_Difference} = \text{CIM}\_B_N - \Sigma_{k=1}^{N-1}\text{CIM}\_Bk \quad \text{Equation 4(a)}$$

Figure 6:
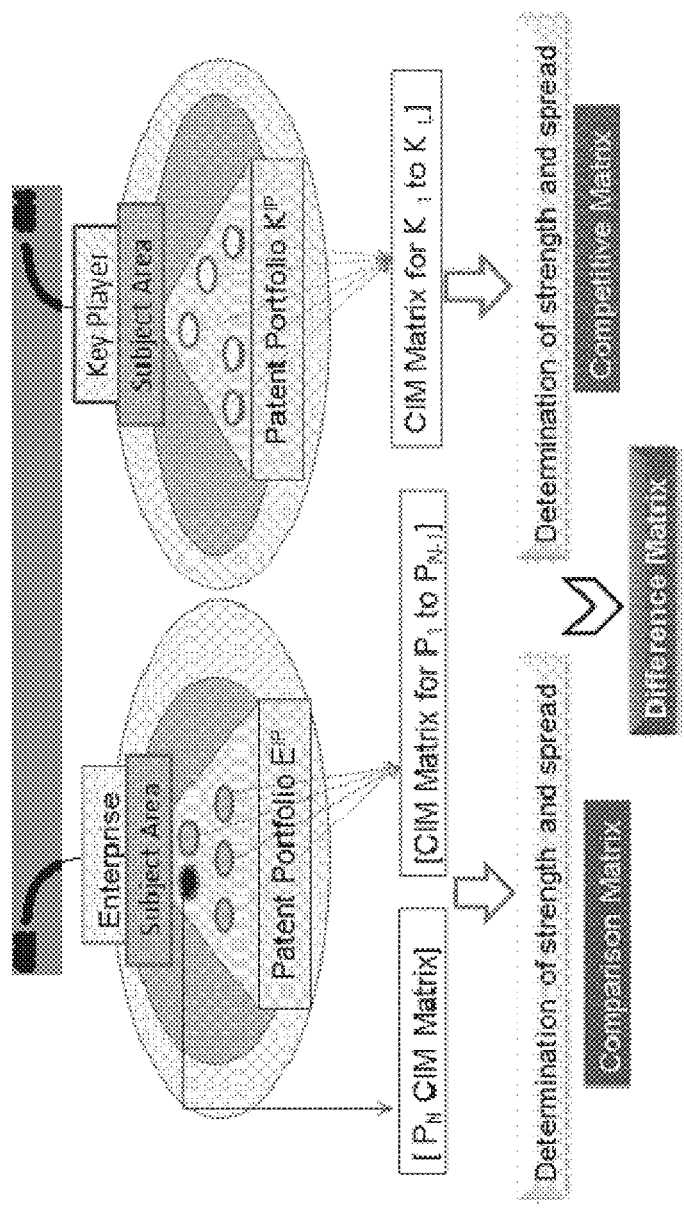
FIG. 6 depicts characteristics of a sustainable claims set, according to an embodiment of the present subject matter.
Figure 6:
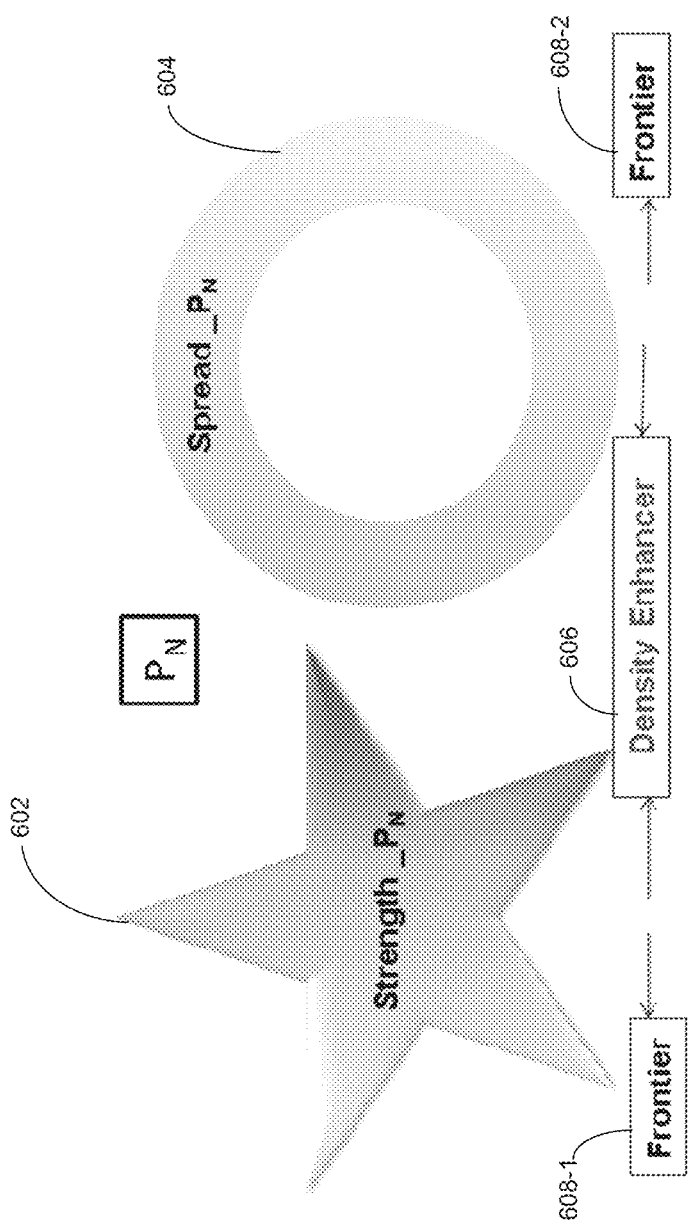

FIG. 6 depicts characteristics of the sustainable claims set, according to an embodiment of the present subject matter. As shown in FIG. 6, the sustainable claims set include the strength cardinality 602 and the spread cardinality 604. In one implementation, the IPS module 212 may define density enhancer 606 and pushing Frontier 608-1 and 608-2 by comparing the prior existence of Comparison matrix claims elements in the same cell (CIM) of $P_N$. The sustainable claims set also includes data pertaining to the density enhance 606 and the pusher frontier 608-1 and 608-2, i.e., density enhancer data and pushing frontier data. In one implementation, the density enhancer data and the pushing frontier data are proportional to the Boolean difference of claim elements in the claims.

In one implementation, the IPS module 112 may generate the competitive CIM matrix by combining claim elements of all active key players, in the chosen subject area A which can compete with the proposed claims set of the new $P_N$. The competitive CIM matrix may be used in the difference CIM matrix analysis stage.

The aforementioned method used to compute the strength, spread and duplicity claim elements and the associated cardinality for comparison CIM matrix may be extended to obtain the competitive CIM matrix. For obtaining the competitive CIM matrix, the IPS module 112 may perform the prior art search analysis with respect to $K^{IP}$ (IP of the key players). The prior art search analysis is carried out to find out the active IP in the subject area A for the Key players $K^{IP}$. In one implementation, the IPS module 112 may obtain the intellectual property or prior arts of the key players from the data repository 108. Cardinality of set K comprising such prior arts from $K^{IP}$ may be represented as $\{K_1, K_2 \ldots K_L \in K\}$ in the area A.

The IPS module 112 may generate the competitive CIM matrix, which will compete with new $P_N$ of the Enterprise. The IPS module 112 may use the same methodology as described above for generating aggregate/combined IP for $E_{IP}$). The IPS module 112 may generate the competitive CIM matrix for Kj {CIM (Kj)}, the competitive CIM Score for Kj {Score (Kj)}, and the competitive Boolean Score for Kj {Boolean_(Kj)}. Thereafter, the IPS module 112 may construct the aggregate virtual IP of K as an aggregate of existing $K^{IP}$ in the similar manner as has been done for EIP, i.e., $\Sigma_{j=1}^{L} CIM \{Kj\}$.

The IPS module 112 may generate competitive CIM matrix (CO_CIM matrix) for $\Sigma_{j=1}^{L} CIM \{Kj\}$. The IPS module 112 may generate score for the competitive matrix (CO_CIM matrix) as Combined_Score_CIM$\{K_L\}$). Further, the IPS module 112 may generate the Boolean for competitive matrix (CO_CIM matrix) as Combined_Boolean_CIM$\{K_L\}$ In one implementation, after obtaining the comparison CIM matrix and the competitive CIM matrix, the IPS module 112 may generate the difference CIM matrix to determine the competitive advantage that the new invention/innovation $P_N$ may bring in the technology landscape/marketplace in comparison with active IP of the Key Players, while considering $P_N$ alone or in aggregation with the $E^{IP}$ patents' support. The IPS module 112 may generate the difference matrix based on an innovative claims differentiation methodology.

The claims differentiation methodology illustrates three scenarios. First, the $P_N$ is picking up a new cell with respect to the K (Retaining Weight factor=1), these claimable elements of $P_N$ may be defined as the Clean Set elements. Second, the $P_N$ is picking up a cell where K already has its footprint; however $P_N$ is significantly and substantially unique and not obvious with respect to the existing $K^{IP}$ claim element of that corresponding cell to a person skilled in the art; (in one embodiment, the Retaining Weight factor may be considered to have value 1); these claimable elements of $P_N$ may be defined as Strong Difference. Third, the $P_N$ is picking up a cell where K already has its footprint; and $P_N$ is not significantly different from the K-claim element of that corresponding cell to a person skilled in the art. This scenario can further be subdivided into two categories. In the first category, the K-claim element for that cell has come out of disparate entities/competitors, (in one embodiment, the Retaining Weight factor may be considered to have value as: Retaining Weight factor=$\alpha$, $0.25 \leq \alpha \leq 0.5$); these claimable elements as may be defined as distributed Difference. In second category, the K-claim element for that cell has come out largely from one single competitor or a competitor with its probable M&A possibilities, (in one embodiment, the Retaining Weight factor may be considered to have value as, retaining Weight factor=$\beta$, $0.1 \leq \beta \leq 0.25$); these claimable elements as may be defined as Fuzzy Difference.

Based on the above scenarios, the IPS module 112 may generate the difference CIM matrix. Thereafter, based on the difference CIM matrix, the IPS module 112 may obtain a set of sustainability differentiators, which may be further used for obtaining a competitive advantageous (sustainable) claims set of $P_N$ ($\Delta$). The $\Delta$ may be obtained based on Equation 5 provided below.

$$\Delta(\text{Competitive Advantageous claims set of } P_N) = (1 \times \text{Cardinality}\{\text{Clean Set}\} + 1 \times \text{Cardinality}\{\text{Strong difference}\} + \alpha \times \text{Cardinality}\{\text{Distributed difference}\} + \beta \times \text{Cardinality}\{\text{Fuzzy Difference}\})$$

Equation 5

Further, the analysis of comparison CIM matrix and the competitive CIM matrix may lead to some of the claims elements, hereinafter referred as the set $\tau$, of the invention $P_N$ not being valid anymore as they have close proximity with prior art elements from $K^{IP}$. These elements are the potential source of weak links or Gaps in the fence which $K^{IP}$ may target to fence off thereby penetrating into $E^{IP}$'s defense. However, removing these potential claims elements may affect the overall claims description and hence, the IPS module 112 is configured to integrate these claims elements with overall claims description based on a user input. The user may be an IP analyst, who handles IP related matters in the Enterprise. After completing this exercise, the IPS module 112 recalibrates all measurements around $P^N$ and run the iterative steps.

Thus the IPS module 112 may determine if $P_N$ is a sustainable IP in atomicity or if it can be made into a sustainable IP in atomicity, which helps in maintaining the sustainability of the new invention in the predefined technology area A, by claims differentiation with respect to sequential claims aggregation of the existing Enterprise IP ($E^{IP}$) and the IP from the active key players across the globe ($K^{IP}$). Further, the claims differentiation methodology for aggregate Enterprise patents against aggregate active key players' patents highlights weak link data, which can be scoped further for strengthening or spreading by innovating/improvising around such claim areas. The rationalization imparts sustainability in a new patent application $P_N$ as well as organizes the Enterprise's IP creation process by a standardized approach.

In one implementation, for parsing of the claims elements, the IPS module 112 may create a Digital IP genome for each claim element of the claims in the new patent or the invention.

Claims Parsing may stand as the heart of Portfolio analysis problem and is a very active area of modern research on Parsing and Natural Language Processing. Typically, NLP methodology for analyzing patent claims combines symbolic grammar formalisms with data intensive methods, whose output should capture both the structure and content of a claim text. However, it is challenging to capture the non-deterministic/evolutionary factors of Claims parsing methodology, as well as its objective to automatically compare a very large volume of claims set which is an essential element for an optimized portfolio management. The present subject matter proposes herein a Claims parsing methodology to get seamlessly integrated with the IPS module 112.

As is understood, any patent typically has at least two structured data sets: the specification also referred to as draft, and the claims. The draft is a structured document that can be segmented into multiple sections, for example, title, inventor, bibliographic data, abstract, introduction/background, summary, brief description of drawing, detailed specification/description, claims, and figures. The bibliographic section is further sub-structured as reference, for example, priority date, application grant date, application number, publication number, grant number, assignee name and address, inventors name and address, and attorney docket number. The figures and components are also labeled with definite schema and the sections or sentences describing the corresponding components are further tagged with the same number schema. Each sentence, each paragraph of the draft can be further tagged with a numeric schema. Further, while each jurisdiction for patent application prosecution has certain aspects of variation with respect to other jurisdiction, however, there is an overall high level of uniformity and the jurisdiction variation is also well structured.

The draft comprises a set of claims, which defines the scope of legal protection of an invention. The claims are also a structured dataset having 3 segments, namely, a preamble, a transition and a body. The body-segment may be further sub-segmented into claim elements, and each of the claim elements may be separated by a semicolon delimiter or by the like. The preamble covers the broad technical environment for the invention. For example, a computer-implemented method, a method, a system, and a computer readable medium. The transition is a word or a phrase between the preamble and the body. For example, comprising, consisting of, including, consisting essentially of, and the like. The body includes main elements of invention. For example, a method claim of the patent lists method steps generally in the order in which they are to be carried out.

A patent or a patent application may have a set of N claims. The N claims may further have N' number of claims elements. Therefore, the N' is the number of claim elements which is a superset of N. The N claims may include a set of independent, dependent and multiple dependent claims and the corresponding claim elements. The N' claims elements can systematically be represented by a tree-structure referred to as claim-element tree.

The Claims tree may represent a structured information flow of claimable subject matter. The claimable subject matter in the body element of an independent claim may further be detailed down with focused/narrower throughput for subsequent dependent claim body of the corresponding independent claim. The same approach is repeated for second dependent claim detailing down of the dependent claim body element.

Figure 8:
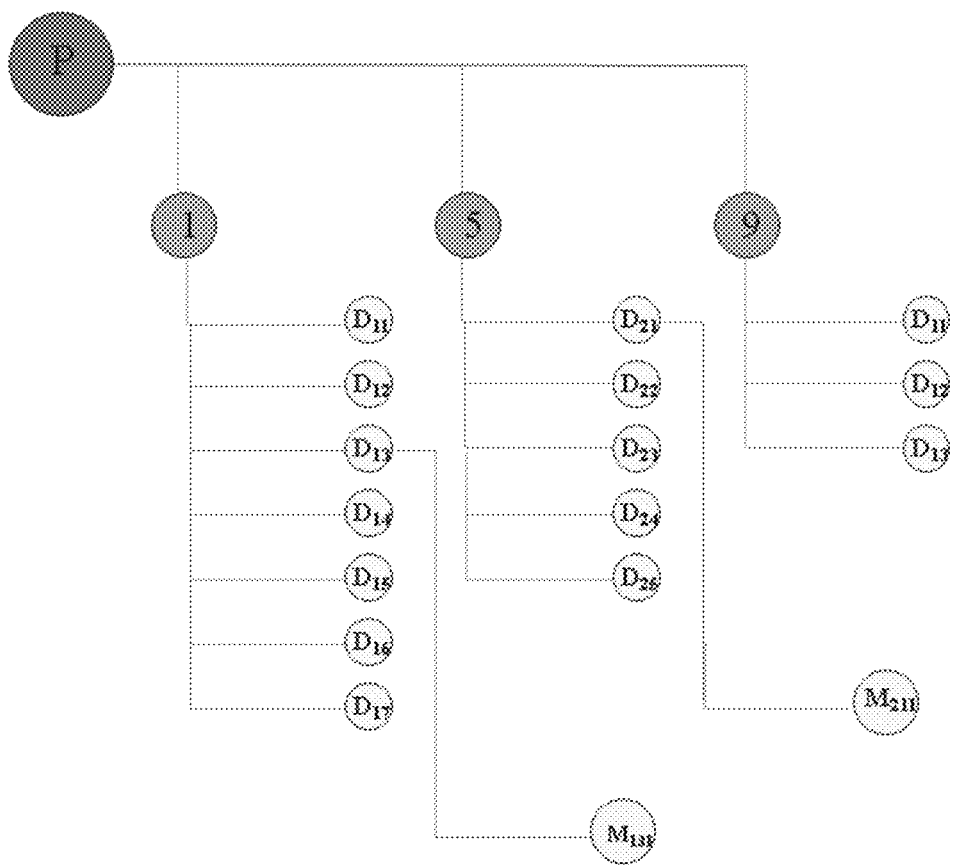
FIG. 8 depicts a claim-elements tree, according to an embodiment of the present subject matter.

FIG. 8 depicts the claim-element tree, according to an embodiment of the present subject matter. As shown in FIG. 8, P is a patent or patent application having three independent claims represented by $I_1$, $I_2$, and $I_3$. $D_{11}$, $D_{12}$, $D_{13}$ . . . , and $D_{17}$ are dependent claims dependent on $I_1$. $M_{131}$ is a multiple dependent claim dependent on dependent claim $D_{13}$ which is further dependent on the independent claim $I_1$.

It is important to mention here that a patent application undergoes various phases or versioning, while being examined by the Patent Examiner. Each examination report can result in omission/deletion, amendments, alteration, truncation and joining of claims and sometimes even addition of new claims or claims elements. Thus, the Digital IP Genome for a set of claims needs to be versioned appropriately with facility of 'Automation in Discovery' for $K^{IP}$ data.

In one implementation, the IPS module 112 creates a Digital IP genome of each claim element of the claims to obtain a Digital IP genome set for the claim set. The Digital IP genome may represent a particular element of the patent or the patent application along with the other details, such as application or patent number, jurisdiction of the patent, and mapping of the claim element to a cell of the CIM matrix. The Digital IP genome obtained for each claim element of the patent or patent application may be aggregated to obtain a Digital IP genome set. Further, representation of a claim element in the Digital IP genome is helpful for depicting and analyzing large volume of data related to the intellectual property.

Figure 7:
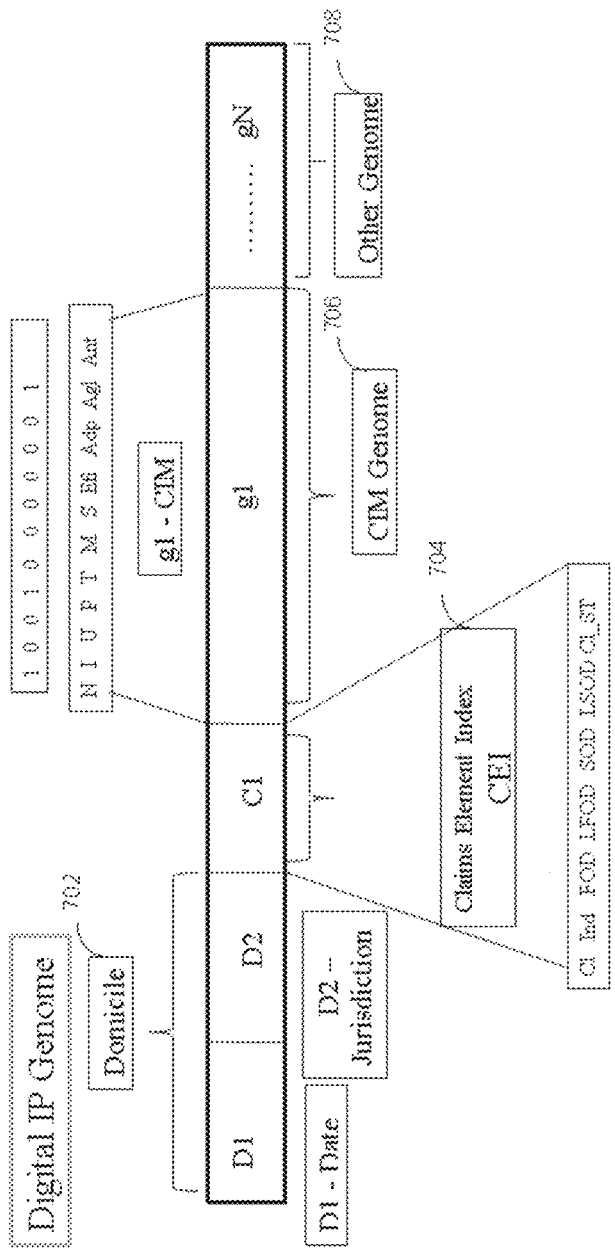
FIG. 7 illustrates an exemplary Digital IP genome, according to an embodiment of the present subject matter.

FIG. 7 illustrates an exemplary Digital IP genome, according to an embodiment of the present subject matter. As shown in FIG. 7, the Digital IP genome may include a domicile 702, a claim element Index 704, a CIM Genome 706, and other genomes 708. Each claim element can be represented by the domicile. The domicile 702 may include at least a string of 16 digits. First 8 digits may be used to represent a date related to the patent or patent application in a specific format, such as dd/mm/yyyy. The remaining 8 digits may be used to represent jurisdictional indices. However, the string length no way limits the concept and the scope of the present subject matter. The domicile data may further comprise an assignee data, inventor(s) data and at least one of intellectual property classification data.

In one implementation, the IPS module 112 may generate the claim element index 704 which may be further used for generation of the Digital IP genome. The generation of the claim element index 704 is based on a lexical analysis. The lexical analysis usually generates token from a sequence of characters with a collective meaning, while reading from one direction to other, i.e., from left-to-right (LR parsing) or right-to-left (RL parsing). There are usually only a small number of tokens for a programming language: constants, operators, punctuation, and reserved words. The IPS module 112 may perform a bi-sequential lexical analysis on each claim of a claims set.

First, the IPS module 112 can divide the entire claim sentence into words, operators, punctuations and constants, as described above. Thereafter, the IPS module 112 search for the word compris* (* corresponds to word stemming), include*, consist* and the like and may create three tokens, namely, for compris*, strings of characters prior to compris*, compris*, and strings of characters after compris*. In case, if the search output (s) results in multiple compris* (s>1), then the IPS module 112 may execute the 'transition search' algorithm to perform tokenization. In another embodiment, IPS module 112 may take the first compris* to perform tokenization. In another implementation, the IPS module 112, by tokenization, divides a claim sentence into three tokens, namely, the preamble, the transition and the body. However, a person skill in the art would appreciate that selecting 'compris*' is one of the embodiment of the present subject matter and in no way limit the scope of the invention.

Subsequently, the claim element index for each claim element is generated from the preamble. As each claim may correspond to multiple claims elements, the IPS module 112 may perform following steps to obtain the claim element index. Firstly, the IPS module 112 may take the first token or Preamble and perform further tokenization. The IPS module 112 may search for the word claim*. If the IPS module 112 identifies that search output results in multiple claim* (s'>1), in such case, the IPS module 112 may take the first claim* into consideration. Thereafter, the IPS module 112 may search for an arithmetic number (operator) separated by a spacebar after the chosen claim* word and if found, the IPS module 112 may construct the token.

Secondly, the IPS module 112 may determine status of the claim, i.e., whether the claims is the independent claim or the dependent claim or multiple dependent claim. For the purpose, the IPS module 112 may create 5 Counters, for example, independent claim (Ind), first order dependent (FOD), link first order dependent (LFOD), second order dependent (SOD), and link second order dependent (LSOD). Thereafter, if an arithmetic number (operator) separated by a spacebar after the chosen claim* word is not found, the IPS module 112 identifies the claims as the independent claim. In such cases, the IPS module 112 may set the Counter Ind as 1 (or with appropriate number) while all the remaining counters are zero. If an arithmetic number (operator) separated by a spacebar after the chosen claim* word is found, the IPS module 112 may identify that the claim is either the dependent claim or the multiple dependent claim, based on the pointer of the arithmetic number. If the arithmetic number corresponds to independent claim, the IPS module 112 may set the LFOD with the independent claim number and the FOD with appropriate nonzero number. Further, if the arithmetic number corresponds to dependent claim, the IPS module 112 may set the LSOD with the dependent claim number and the SOD with appropriate non-zero number.

Thirdly, the IPS module 112 may determine the claim elements for each claim and generate claims elements index. For the purpose, the IPS module 112 may take the body token and divide it into further tokens with semicolon or and as delimiter. Thereafter, the IPS module 112 may set the claim element index counter appropriate with the output of previous operations.

Figure 9:
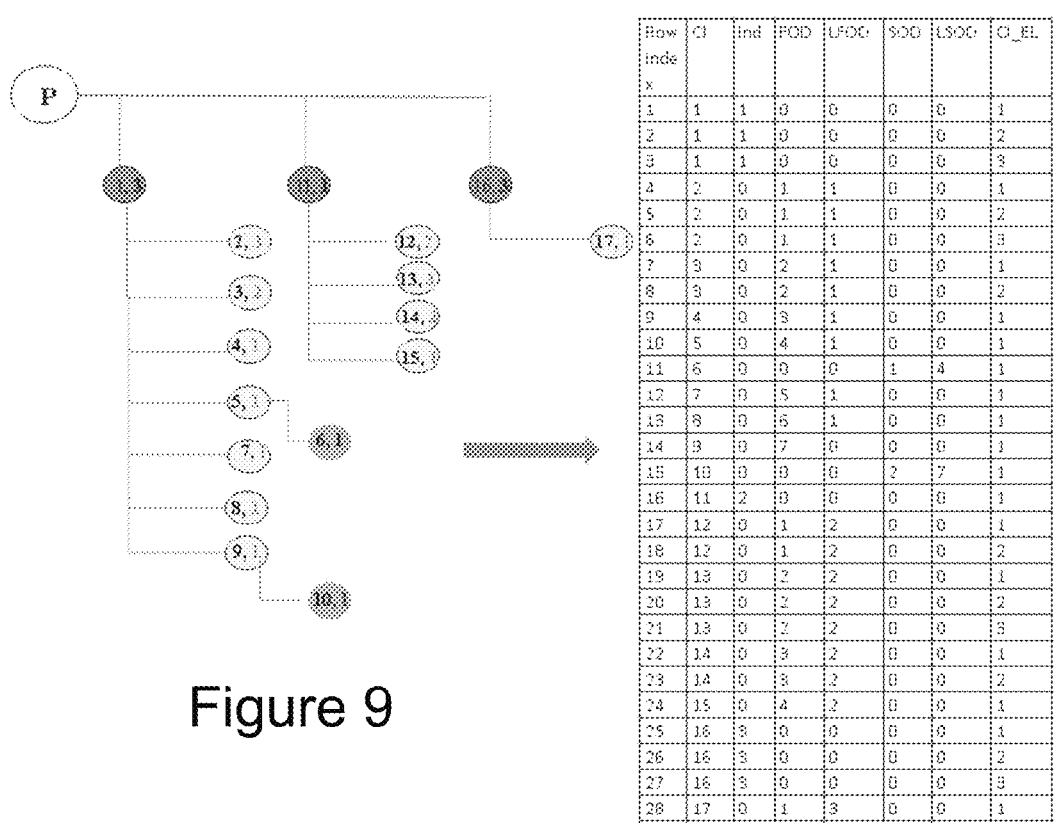
FIG. 9 depicts a claim element index table for a specific claim-elements tree, according to an embodiment of the present subject matter.

FIG. 9 depicts a claim element index table for a specific claims-elements tree, according to an embodiment of the present subject matter. In the claim element index table, Cl is claim number, Ind is number of independent claim, FOD is first order dependent, LFOD is link first order dependent, SOD is second order dependent, LSOD is link second order dependent, and Cl_EL is a number for the claim element. As shown in FIG. 9, there are 28 claim elements index for the specific claims-elements tree. First row of the claims element index (CEI) table depicts the CEI for first element of the first claim, which is an independent claim. Eleventh row of the claims element index table depicts the CEI for a first element of the multiple dependent claim 6 which is second order dependent on claim 1 and link second order dependent is 4, which mean the claim 5 is the $4^{th}$ dependent claim on claim 1. Similar, other rows of the table corresponds to different claims elements in the claim set.

Once, the claim element index is determined for each of the claim elements, the IPS module 112 may then determine the CIM genome 806 based on context sensitive grammar and evolutionary algorithm. As per the CIM matrix, any claim element can be mapped onto one cell of the 48 cells of the CIM matrix orchestrated by NIU Category, PTMS Coverage Area and EA3 sustainable characteristic. Although the manual implementation of such process with expert's guidance is more deterministic, automation in the process can be more probabilistic resulting in distant/multiple match. Thus, an approach based on Genetic Algorithm incorporated with Claims Parsing with Context Sensitive Grammar (CSG) has been proposed to address the scenario.

In one of the embodiments, the probabilistic factors in the process of claims automation may arise from 'Lexicographical challenges' wherein a claim word may be used in a claim with contextual meaning, where the semantic or ontology based root determination may have different interpretation.

In another embodiments, the probabilistic factors in the process of claims automation may arise from Technology-tagging challenges, wherein the claim words may represent technological or technical data which are difficult to link/connect to one particular technology/patent classes (or similar attributes) due to emergence of various interdisciplinary tech. fields, mash-up technologies, new technologies, etc. In another embodiment, the probabilistic factors in the process of claims automation may arise from Non-claimable element relating to commercial advantages or other non-technical matter, which may lead to less conclusive interpretation. In another embodiment, the probabilistic factors in the process of claims automation may arise from Broadening vs. narrowing semantic. This is an important issue in the context of claims sustainability/capability and may be addressed by the sustainability analysis based on Strength, Spread and Duplicity cardinality determination, as the embodiment of the present subject matter.

In one implementation, a set of claims elements are created from a claim with common preamble and transition part, being linked to each claim element belonging to that particular claim where the claim elements are separated/delimited either by semicolon or by and. Thus, the claim element may have (Subject: Preamble) <Verb phrase: Transition> (Predicate or Object: Claim element) kind of structure.

The transition part acts as the head verb phrase (head VP), which has one left non-terminal as the preamble and the other right non terminal (N) as the claims element body part. In one implementation, context sensitive grammar (CSG) may be used to create context sensitive language, which although looks formally quite similar to the CFG (Context free grammar) with regular right hand side (r.h.s. is a terminal (T) for CFG). Thus, restrictions are eliminated by allowing rules or production (E) to have two non-terminals (N) on either side of the head VP.

Thereafter, based on the CIM dictionary 110, after the lexicalization and word tagging of both the l.h.s. non-terminal and r.h.s. non-terminal, trained by the CIM dictionary, tokens are generated. The tokens or words/lexicons are then further trained with the respective part of the detailed description to optimize the contextual meaning. Further the keywords may be mapped to their corresponding metadata, for example, figure element number, in the patent draft. In such scenario, search being carried out by parsing of the corresponding paragraphs from the detailed specification or figure caption, to optimize the token creation incorporating semantic or ontology and catching inconsistencies in the meaning.

Once token optimization is performed, the IPS module 112 may analyze the pattern from the sentence structure and the objective is to create diagrammatic sentence structure or claim element patterns. Such pattern is then parsed further with the parser (LR or LALR or an optimized one) to generate output, which can be mapped to a particular cell of the CIM Matrix. However, as the solution is probabilistic, mapping and ranking algorithm has to be performed to obtain the best fitment index, by the evolutionary genetic algorithm. The iteration with genetic algorithm to generate new species by mutation may take place until the best fitment index is achieved.

In one implementation, the CIM genome $C_i^t$ (CIM_Genome_$C_i^t$) belonging to the Digital IP Genome Set is represented by a 11-digit binary string based on N-I-U-P-T-M-S-Efi-Adp-Agl-Ant bit, wherein N-I-U-P-T-M-S-Efi-Adp-Agl-Ant are the Category (NIU), Coverage Area (PTMS) and Sustenance Characteristic (EA3) dimensions, respectively. As each claim element represented by CIM_Genome_ $C_i^t$ should be mapped to one and only one cell of the CIM matrix, the CIM_Genome_$C_i^t$ should ideally have only three bits of value '1' (1 each for N/I/U, P/T/M/S and EA3) and the remaining bits with value '0' for the rest 8 digits. For example, if a claim element is fitted to Novelty/Process/Anticipative cell, then the CIM Genome is represented by 10010000001. In another embodiment, The IPS module 112 may construct each CIM_Genome_$C_i^t$ as a combination of 3 genes g1, g2 and g3, wherein g1→{NIU}, g2→{PTMS} and g3→{Efi-Adp-Agl-Ant}. For each of the gene, the right fitment scenario is to have only single bit-1, remaining bit-0.

In one implementation, to perform the Claims parsing with CIM matrix Compliance, the CIM dictionary is a pre-requisite, which is being constructed and will recursively be evolved with newer words/iterations and synonyms. The CIM dictionary may have NIU, PTMS and EA3 classifications with the words populated based on context-sensitive grammar comprising constituents, such as noun phrases, verb phrases, adjectives, and adverbs. Degree of Confusion and Best Fitment Index: However, the process of automation in the Claims parsing may result in a degree of confusion, as it may result in multiple, equi-probable matches within N/I/U Category, or P/T/M/S area or EA3 characteristic classifications for the CIM genome_$C_i^t$, while searching and mapping for probable match of a (word/token) or its synonym within the CIM dictionary. Thus, for a pattern with a collective set of {w} words comprising {w1} words with dominant match and {w2} words with fuzzy match, the best fitment index* for a CIM_Genome_$C_i^t$ may be developed in order to optimize the competency need.

Thereafter, the IPS module 112 performs claim parsing. The claim parsing algorithm with the best fitment index thus operates on an inspect mode, wherein each CIM Genome of $C_i^t$ is evaluated by a given fitness function f (CIM_Genome_$C_i^t$) to give a measure of its fitness. Then, a new population CIM_Genome_$C_i^{t+1}$ gets generated by selecting the more fit solution and therefore the algorithm is evolutionary as it gradually improvises with more data incorporation.

Initially, the IPS module 112 performs word-tagging and lexicalization of words using the context sensitive grammar of the l.h.s. non terminal of $C_i^t$ (CIM_Genome_$C_i^t$) by mapping words (for example, words, such as process, method, methodology, and framework). Then the IPS module 112 performs word-tagging and lexicalization of words in diagrammatic sentence structure (with pre-semantic optimization) for r.h.s. non-terminal. In an example, the word list collected wherein {w}={w1}+{w2} is obtained. The {w1} are the words found in the CIM Dictionary which produce deterministic solution and the {w2} are the words not found in CIM Dictionary or may have multiple match/false hit resulting probabilistic solution.

After obtaining the collected words, the processing module maps the collected words (i.e., {w}) to the Base Genome and incrementing the Counter for NIU/PTMS/EfiAdpAglAnt. Thereafter, a genome counters G for individual claim statement $C_i^t$ towards building (CIM_Genome_$C_i^t$) is created by the IPS module 112. Equation 6 represents the genome counter.

$$\text{Genome Counter } G = \begin{pmatrix} x_1 & y_1 & z_1 \\ x_2 & y_2 & z_2 \\ x_3 & y_3 & z_3 \\ \varphi & y_4 & z_4 \end{pmatrix} \quad \text{Equation 6}$$

In one implementation, the IPS module 112 generates the fitness function and mapping and ranking algorithm to determine fitness of (CIM_Genome_$C_i^t$). The mapping and ranking algorithm may include various steps. At first step, given the maximal of 4 elements at a given column, a column can generate 4 Ranks, hereinafter referred as R1, R2, R3 and R4, corresponding to 4 different counter values, as in shown in Equation 7.

$$GExit = \begin{pmatrix} x_1^i & R1 & y_1^i R4 & z_1^i & R1 \\ x_2^i & R2 & y_2^i R2 & z_2^i & R2 \\ x_3^i & R3 & y_3^i R1 & z_3^i & R3 \\ \varphi & \varphi & y_4^i R3 & z_4^i & R4 \end{pmatrix} \quad \text{Equation 7}$$

In the example illustrated above, N and I, have Ranks R1 and R2 respectively, M and T have Ranks R1 and R2 respectively and Efi and Adp have Ranks R1 and R2 respectively.

At second step of the ranking algorithm, the Rank_GExit matrix gets generated with the column elements being chosen for the top two Ranks (two possibilities: all R1 OR R1 and R2), as given in Equation 8.

$$\text{Rank\_GExit} = \begin{bmatrix} x_1^i & R1 & y_3^i R1 & z_1^i & R1 \\ x_2^i & R2 & y_2^i R2 & z_2^i & R2 \end{bmatrix} \quad \text{Equation 8}$$

At third step of the ranking algorithm, fitness function f (CIM_Genome_$C_i^t$) is determined. The Rank_GExit with the column elements for the top two ranks can produce 2×2×2=8 different Cell fitment combinations. Hence, the Valid G-c length=8 (i.e., 8 rows of Cell Fitment_GExit) which is illustrated as given in Equation 9

$$\text{Cell Fitment\_GExit} = \begin{pmatrix} V1 & x_1^i y_3^i & z_1^i \\ V2 & x_1^i y_3^i & z_2^i \\ V3 & x_1^i y_2^i & z_1^i \\ V4 & x_1^i y_2^i & z_2^i \\ V5 & x_2^i y_3^i & z_1^i \\ V6 & x_2^i y_3^i & z_2^i \\ V7 & x_2^i y_2^i & z_1^i \\ V8 & x_2^i y_2^i & z_2^i \end{pmatrix} \quad \text{Equation 9}$$

Thereafter, the IPS module 112 may select the Best Fitment Index, Fitment Function f(CIM_Genome_$C_i^t$) and determines the iteration of population. The Genetic Algorithm to determine best fitment of the CIM_Genome begins initially with the population of all 48 possibilities of CIM_Genome, which defines the Search Space. The Algorithm (GA) then evaluates the 48 possibilities to allocate reproductive opportunities in such a way that the Genomes (e.g., V1, V2, V3 and V4 in the aforementioned example) which represent a better solution to the target problem are given more chances to reproduce, wherein the goodness/fitness of a solution is typically defined with respect to the current population. As described above, at the end of 1st iteration, top 4 Cells, in this case V1, V2, V3 and V4, may be considered as the probable/potential solution and may be chosen for the next iteration by deliberating with unknown word list {w2}.

In one of the embodiments, the fitness of CIM_Genome may be given by the fitment Function f(CIM_Genome_$C_i^t$) in such a manner so that it corresponds to maximum matching of the word list {w}, i.e., when w1→w OR w2→0. Thus, f(CIM_Genome_$C_i^t$) is given as Equation 10.

$$f(\text{CIM\_Genome\_C}_i^t) = \left|1 - \left(\frac{w2}{w}\right)\right| = \left|\left(\frac{w1}{w1+w2}\right)\right| = \left|\left(\frac{w1}{w}\right)\right| \quad \text{Equation 10c}$$

In a computationally realistic scenario, the iteration will end when the W_difference will follow as given in Equation 11.

$$\frac{w1-w2}{w1+w2} = \frac{w1-w2}{w} \geq 1/2 \quad \text{Equation 11}$$

For the last iteration, only the top Cell may be chosen as the Best-fitted cell.

Further, in one implementation, the IPS module 112 may perform mutation while claim parsing. The process of mutation with respect to the CIM_Genome Search Space will happen after every iteration as more words-matching will produce more deterministic solution (i.e., w1→w OR w2→0) to the problem. Hence, at the end of each iteration, the CIM_Genome may undergo mutation, with the topmost Rank and Value (V1) will be selected as the best-fitted Genome. An example is given below:

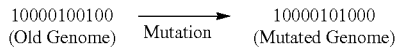

10000100100  →  10000101000
(Old Genome)  Mutation  (Mutated Genome)

In the above example, the CIM_Genome undergoes mutation where topmost Rank cell gets changed from N/M/Adp→N/M/Efi; one can alternatively emphasize that the EA3 gene of CIM_Genome underwent Mutation.

The sustainable Intellectual Property in atomicity may eventually be grouped into Intellectual Property portfolios which also are needed to be optimized and sustainable. Therefore, a new set of data structures, a variety of stratification rules and mapping algorithm for sharpening the scope of IP Portfolio Optimization are required. The proposed methodology and data structures may offer scalability and optimization from level to a large-scale optimized Intellectual Property Portfolio by computing and displaying a number of intermediate Data sets. Such data sets may be viewed as decomposed fragments or partial (predefined data centric) visualization of an Intellectual Property Landscape and may carry patterns and trends significant for the analysis.

In one implementation, the landscape analytics module 114 may create a new set of data structures, a variety of stratification rules and mapping algorithm for sharpening the scope of IP portfolio optimization. The new set of data structures offer scalability and optimization from IP Sustainability level to a large-scale optimized IP portfolio by computing and displaying a number of intermediate Data sets. Such data sets can be viewed as decomposed fragments or partial visualization of the IP landscape and may depict one or patterns and trends related to the IP portfolio.

In one implementation, the landscape analytics module 114 may include a patent map generation module 114-1 configured to create a patent map. The patent maps can be formed on the strength and spread cardinality of comparison, competitive, difference and topology matrices dataset by clubbing (with disjoint visualizations/views) of individual subject areas $A_1, A_2, \ldots A_M$ to an intermediate area ($\Delta$). Also, a time sequential projection of individual patent maps and their aggregate can be displayed. The intermediate area ($\Delta$) is formed by sampling over technology areas ($A_1, A_2, \ldots A_M$) and select the ones with synergy function.

Some of the Synergy functions may be described as a dataset linked by CPC/IPC classes or by keywords from Claims, a dataset linked by Citation map/link of Citation community, or a dataset linked by generic keywords from the Field of invention/Abstract section of patent application which may get mapped to pre-define business cluster definitions, etc.

Hence, the stratification of intermediate datasets can be initiated from the comparison CIM matrix, competitive CIM matrix, difference CIM matrix and topology CIM matrix, which have been analyzed for an area A. For each of these matrices for a particular technology area, following metadata is available: (1) sets of claims keywords, hereinafter referred as CIM keywords, from the claims set, which are being generated during Claims parsing exercise and can further be incorporated in the CIM dictionary, (2) strength Cardinality and Spread Cardinality of the Claims set and categorization/classification of claim elements into strength, spread or duplicity classes, (3) sets of keywords (generic, either disclosed in the invention disclosure form (IDF) or from the taxonomy from technical field (or Abstract), which categorizes the invention in certain technical/business classes/domains), (4) set of claims, (5) claims tree for parsing, (6) IPC/CPC/USPC classification, and (7) citation community links. The above description is for clarity of understanding and does not limit the scope.

Hence, the $E^{IP}$ and $K^{IP}$ related data can be clustered and displayed based on the following sets of attributes, namely, CPC (or IPC/USPC), generic keywords, CIM keywords, strength cardinality, and spread cardinality. Such classified data can further be taken forward for this intermediate level analysis.

In one implementation, in order to carry out intermediate level analysis, the landscape analytics module 114 may employ various approached to scale up the technology area. In one of the approaches, the landscape analytics module 114 may perform data gathering. The pre-existing technology areas are referred to as M in $\Delta$ for an intermediate-level portfolio problem statement. The landscape analytics module 114 may define a solution space comprising all possible and meaningful combinations of the intermediate-level input dataset $\Omega$. The landscape analytics module 114 may also define conjugate solution space spanned over all the intermediate-level input dataset from the corresponding conjugate technology area $A_1^*, A_2^*, \ldots A_M^*$ in the technology area space $\Delta^*$, which forms the conjugate intermediate-level input dataset $\Omega^*$. In one of the embodiments, Conjugate technology area may be defined as the product or offering related aspects corresponding to a technology area.

Then, the input dataset $\Omega$ (or its conjugate input dataset $\Omega^*$) can be constructed as follows:

The input dataset contains comparison matrices $C_1, C_2, \ldots C_M$ for the Enterprise $E^{IP}$ created for various individual technology areas $A_1, A_2, \ldots A_M$. These technology areas $A_1, A_2 \ldots A_M$ are synergistic and their proximity to each other can further be determined by a proximity factor $\pi\_CiCj$ ($\forall i \neq j$).

The input dataset contains competitive matrices $X_1, X_2, \ldots X_M$ for consolidated key players $K^{IP}$ for the same group of technology areas $A_1, A_2, \ldots A_M$.

The input dataset contains difference matrices $D_1, D_2, \ldots D_M$ for an Enterprise IP assets, viz., $E^{IP}$ with respect to consolidated key players IP dataset, viz., $K^{IP}$ for the same group of technology areas $A_1, A_2, \ldots A_M$.

The input dataset contains topology matrices $T_1, T_2 \ldots T_P$ comprising data from the entire group of technology areas $A_1, A_2 \ldots A_M$, for individual key players $K_1, K_2 \ldots K_P$, respectively.

The above mentioned methodology for creating the input dataset may be repeated with identical logic for the conjugate technology space to create the input dataset $\Omega^*$.

The comparison CIM matrix can also be a single CIM matrix, if there is only one invention in a particular subject area, which is a very rare phenomenon. Further, the entire exercise can be carried in two regulatory modes which are defined as: legal differentiator mode and state of the art mode. In the legal differentiator mode, the matrices generated are created based on considering either the patent applications before grant (Pre_PG) or the granted patent applications (Post_PG). In the state of the art mode, the matrices generated are created based on considering both the patent applications before grant (Pre_PG) and the granted patent applications (Post_PG). All these intermediate matrices are also the CIM matrices which can further be parameterized and visually represented by with their Cardinality pair of Strength Cardinality (St_C) and Spread Cardinality (Sp_C).

In one implementation, the landscape analytics module 114 may define various function mapping for the defining the IP landscape. The landscape analytics module 114 defines a synergy function, which maps the data from the input dataset ($\Omega$ or $\Omega^*$) to the intermediate-level Solution Space $\Gamma$ (or $\Gamma^*$ respectively), based on predefined proximity factors. The landscape analytics module 114 defines a conjugate function, which correlates the data from conjugate technology areas and keeps the resultant dataset to the Solution Space $\Gamma^*$. The landscape analytics module 114 defines a jurisdictional function, which maps the data from the input dataset ($\Omega$ or $\Omega^*$) to the Solution Space $\Gamma$ (or $\Gamma^*$ respectively), based on predefined jurisdiction for filing. The landscape analytics module 114 defines an intersection function, which creates the difference matrices for $C_1, C_2 \ldots C_M$ with respect to Topology matrices $T_1, T_2 \ldots T_M$. The landscape analytics module 114 defines a synchronization function, which maps the data based on predefined/preconfigured time sequence. The landscape analytics module 114 defines are regulatory function, which maps the data from the input dataset ($\Omega$ or $\Omega^*$) to the Solution Space $\Gamma$ (or $\Gamma^*$ respectively), based on the regulatory status of a patent or a set of patents.

In one implementation, the landscape analytics module 114 may generate intermediate topologies. A matrix entry for any patent map construction can generally be represented by two concentric circles, with the values of cardinality pairs (Strength Cardinality and Spread Cardinality) being used as the measures attributing to the circumference of the circular areas, respectively.

Figure 10:
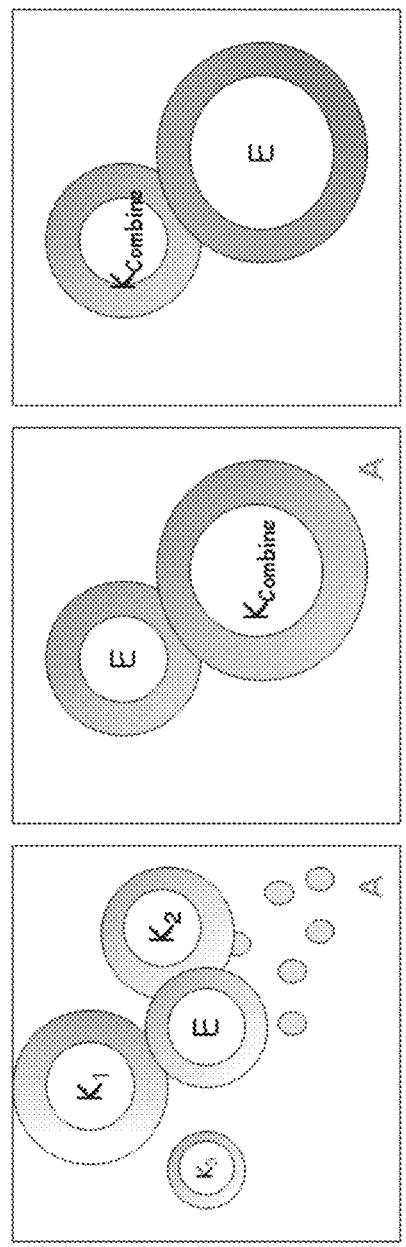
FIG. 10 depicts strength and spread cardinality plotting for Enterprise vs. individual/combined key player(s) (K) and the growth of strength and spread for enterprise with respect to combined K, according to an embodiment of the present subject matter.

In one implementation, the patent map generation module 114-1 may generate an internal patent map. FIG. 10 depicts the strength and the spread cardinality plotting for E vs. individual/combined K and the growth of Strength and Spread for E w.r.t. combined K, according to an embodiment of the present subject matter. As shown in FIG. 10, the patent map generation module 114-1 generates the strength cardinality and the spread cardinality for the Enterprise's IP ($E^{IP}$), i.e., generating the cardinality pair for individual Comparison matrix Ci linked to a particular technology area $A_i$ by claims element mapping for either the legal differentiator mode or state of the art mode. The landscape analytics module 114 further generates the strength cardinality and the spread cardinality for the Key player's IP ($K^{IP}$), primarily $X_i$ for technology area $A_i$, by claims element mapping for the legal differentiator mode or state of the art mode. Hence, an overlapping of these two datasets can determine the legal boundaries of protection/dominance, as shown in FIG. 10, and the future scopes of protection, growth and development for individual technology area $A_i$.

Figure 11:
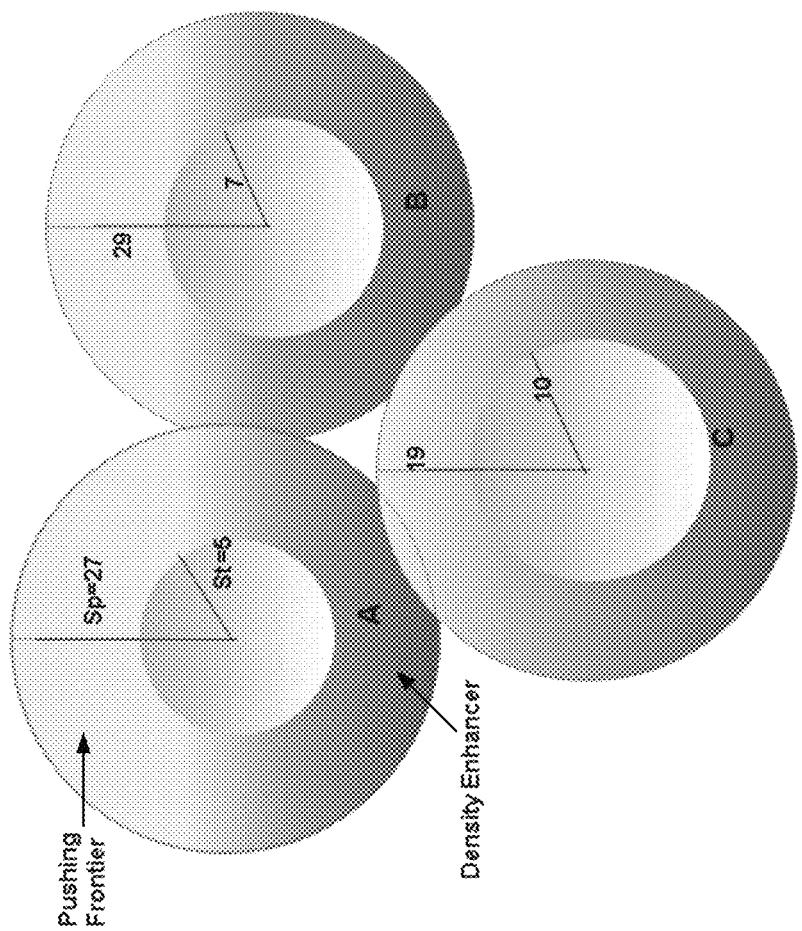
FIG. 11 illustrates strength and spread graph of three patents in an IP portfolio of an Enterprise, according to an embodiment of the present subject matter.

FIG. 11 illustrates a patent map elucidating the strength and the spread cardinality of three patents in an IP portfolio of an Enterprise, according to an embodiment of the present subject matter. As shown in FIG. 11, the strength cardinality and the spread cardinality of three different patents comprising patent A, patent B, and patent C are shown. In an example, the patent A relates to patent management, the patent B relates evaluation of patents, and patent C relates to invention mining. As shown in FIG. 11, spreads of patent A, B, and C are overlapping. It may be understood that, there is a part in each patent which is covering the same spread or widening claimable subject matter.

In one implementation, the patent map generation module 114-1 may create a synergy patent map. The synergy patent map may enable synergy-visualization. In the synergy patent map, the value of Cardinality pair for individual $C_i$, $X_i$, $D_i$, $T_i$ and the value of their corresponding conjugates are needed for the purpose of visualization/display/analytics. Further, the proximity of the patent classes (CPC, IPC, USPC or ECLA)/CIM keywords/Generic keywords, and Citation Community linkage under which the technology areas $A_1, A_2 \ldots A_M$ are distributed, are used.

In one implementation, the landscape analytics module 114 may determine the synergy by checking in the Citation Community, by tracing the citation link, i.e., whether patents from two different technology areas $A_i$ and $A_j$ cite the same patent (Backward Citation) or are getting cited by same patent (forward citation). The landscape module 112 may use an associated scoring logic with a threshold to select the top matches. In another implementation, the landscape analytics module 114 may determine the synergy by matching the keyword sets from different technology areas $A_1, A_2 \ldots A_M$, to determine the proximity of the technological domains. The synergy patent maps can be visualized with a suitable chosen (predefined) combination of at least 2 datasets viz, $C_i$ and $C_j$ (i≠j) or $X_i$ and $X_j$ (i≠j) or $D_i$ and $D_j$ (i≠j) or their conjugate datasets.

Figure 12:
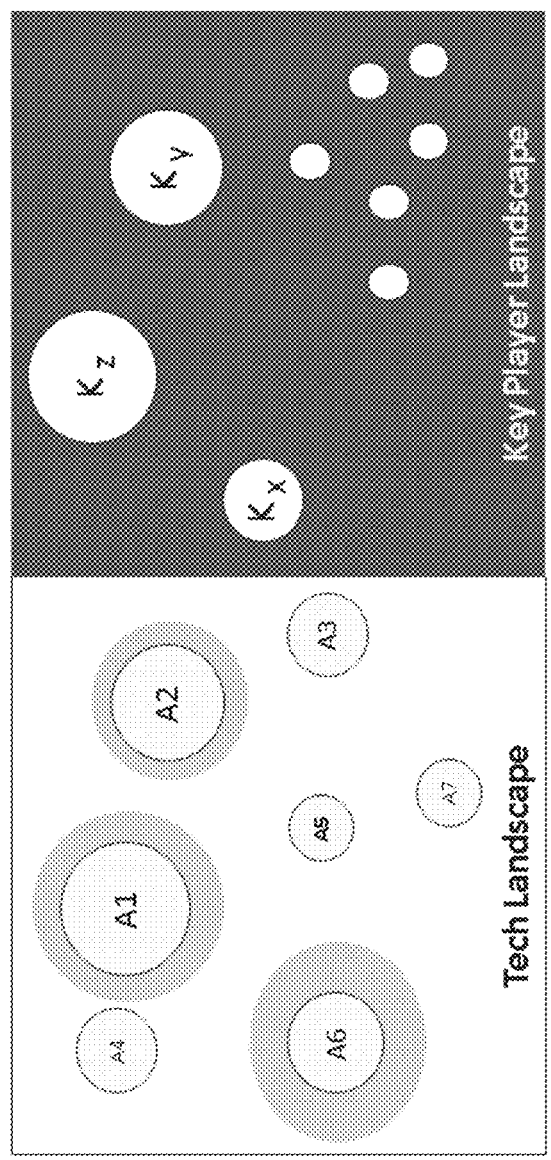
FIG. 12 illustrates a synergy patent map, according to an embodiment of the present subject matter.

FIG. 12 illustrates the synergy patent map, according to an embodiment of the present subject matter. As shown in FIG. 12, proximity of technical subject areas is shown for the $E^{IP}$ and the $K^{IP}$. In one implementation, the landscape analytics module 114 may create a conjugate patent map. The conjugate may depicts combined comparison matrix or competitive matrix datasets which belong to conjugate technology areas $A_i$ and $A^*_i$. In one implementation, the landscape analytics module 114 may create a jurisdictional patent map. The jurisdictional patent may depict the jurisdictions in which a patent has been filed. The jurisdictional patent maps may also be created for $C_i$, $X_i$, $D_i$, and $T_i$.

In one implementation, the portfolio optimization module 212 optimizes the sustainable IP in atomicity based on a portfolio optimization model. The Portfolio Optimization Model involves an Identify-Analyze-Position sequence workflow.

In the identify stage, the portfolio optimization module 212 gathers data from the Sustainable IP in atomicity level and the Intermediate level, which positions the patents sharply and clusters the same in a well-structured technology landscape. The portfolio optimization module 212 may stage further identifies the parameters, viz., the synergy parameters, gain parameters, and risk parameters, for portfolio optimization and gathers data for those parameters with the objective to parameterize the data obtained from the sustainable IP in atomicity.

The portfolio optimization analysis takes place after the intermediate level data analysis, and thus takes the data from both the Sustainable IP in atomicity level and the intermediate level. The portfolio optimization module 212 may gather data, such as patent clusters forming the comparison CIM matrix, the competitive CIM matrix, the difference CIM matrix, the topology CIM matrix, the associated valuation for the resultant claims set from the comparison CIM matrix, the competitive CIM matrix, the difference CIM matrix, the topology CIM matrix, patent maps, citation community, indicative trend analysis related data and associated metrics towards synergy, growth determination, and decay analysis incorporating regulatory parameters to determine discarding elements The parameters may be classified into three classes: the Synergy, Growth and Strategic Alignment parameters, valuation and Gain parameters, the risk parameters.

In the analyze stage, the portfolio optimization module 212 analyzes the data obtained from the identify stage and performs multiple objective portfolio optimization analysis, based on predetermined or customized objective functions. The genetic algorithm may be used as one of the approaches to perform such analysis. The portfolio optimization module 212 may use various objective functions comprising risk objective function, gain objective function and synergy objective function for technology areas to vary from 1 to M ($A_1, A_2 \ldots A_M$) and key players to vary from 1 to K.

In one implementation, a multi-objective optimization methodology based on Genetic Algorithm may be employed, to perform on the Digital IP Genome set towards optimizing multi-objective goals. For the purpose, a modified Digital IP genome set may be obtained.

Figure 13:
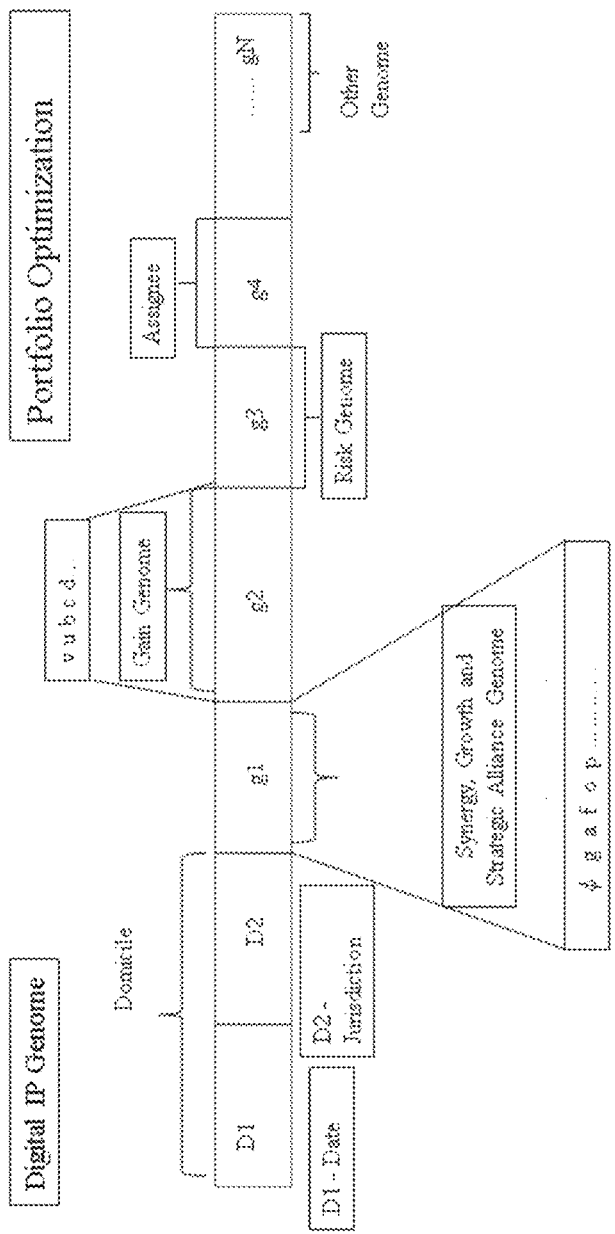
FIG. 13 depicts the modified Digital IP genome set, according to an embodiment of the present subject matter.

FIG. 13 depicts the modified Digital IP genome set, according to an embodiment of the present subject matter. The modified Digital IP genome comprises M genomes, namely, risk genome, gain genome, assignee genome, synergy, and growth and strategic alliance genome, along with the domicile part of the Digital IP Genome set being taken forward from the claims parsing Digital IP genome set data. Each of these genomes further comprises of $L_1, L_2 \ldots L_M$ number of genes. For example, the risk genome comprises valuation risk gene and legal risk gene, whereas the gain genome comprises valuation of Enterprise patents gene, valuation of key player patents gene, expected acquisition cost gene, expected sales cost gene, etc. All these genomes data can be initiated from the seed data being obtained from the Identify stage. One can also initiate the analysis with random data values. Consequently, the portfolio optimization module 212 may perform the Genetic algorithm on the modified Digital IP genome set to evaluate the best fitness index.

Further, the portfolio optimization module 212 may generate the fitness function. Given a set of goals, fitness function may get generated based on a select set of goals, which are required to be optimized in a particular context.

In the position stage, the portfolio optimization module 212 generates various positioning scenarios based on the analyze stage data. The scenario may include relative uniqueness against Market, relative uniqueness and nearness against a Key Player, relative uniqueness of one of the Key Players against the Enterprise, relative uniqueness against a set of Sundry Players, and licensing/Tech Transfer/M&A: Relative uniqueness of a set of Sundry Players against the Enterprise.

Figure 14A:
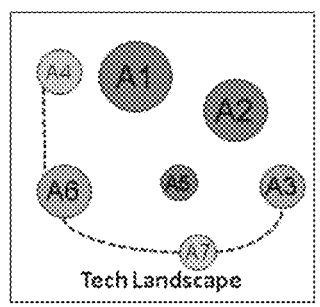
FIGS. 14(a), 14(b), and 14(c) depict patent portfolio strategy a particular technological subject area, according to an embodiment of the present subject matter.
Figure 14B:
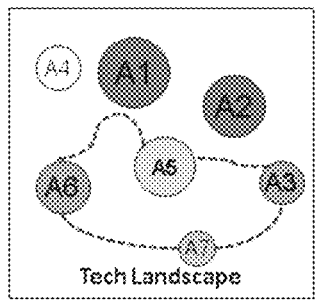
Figure 14C:
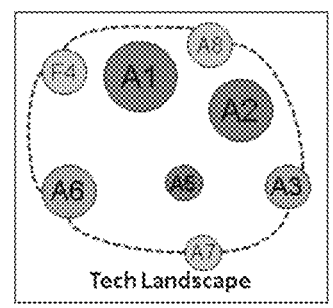

FIGS. 14(a), 14(b), and 14(c) depict patent portfolio strategy in a particular technological subject area, according to an embodiment of the present subject matter. FIG. 14(a) depicts a strategy of promote patenting. As shown in FIG. 14(a), $A_4$ is promoted and novelty of the $A_4$ is extended. FIG. 14(b) depicts a strategy of defense. As shown in FIG. 14(b), the IP portfolio of the Enterprise is expanding in a technological area $A_5$. The strategy of defense may include flooding, fencing, and strengthening. The flooding is employed when no key player is dominating in the technological subject area. The fencing is employed, if some key players are dominating in the technological subject area. The strengthening is employed, if the technological area is core to the business of the Enterprise. FIG. 14(c) depicts a strategy of offense. As shown in FIG. 14(c), new extensions are created to encircle and fence off the competition such that the possibility of negotiation is there in the IP portfolio. The strategy of offence may employ a surrounding technique when there is only one dominant key player and a patent networking when more than one key player are dominant in the same technological subject area.

In one implementation, the SEO module 214 may identify portfolio led offerings in the form of product, product line, process, and services in the global marketplace. The sustainability of the offerings germinates necessary challenges which need to be addressed on an immediate/continuous basis. The Enterprise IP ($E^{IP}$) as the backbone of such offerings with respect to active key players IP ($K^{IP}$), can thus be considered as the crucial factor to keep other key players away from market by legally protecting with priority, make necessary fencing around for defense and cross licensing opportunities, and leverage as the currency to the next generation trade.

Figure 15:
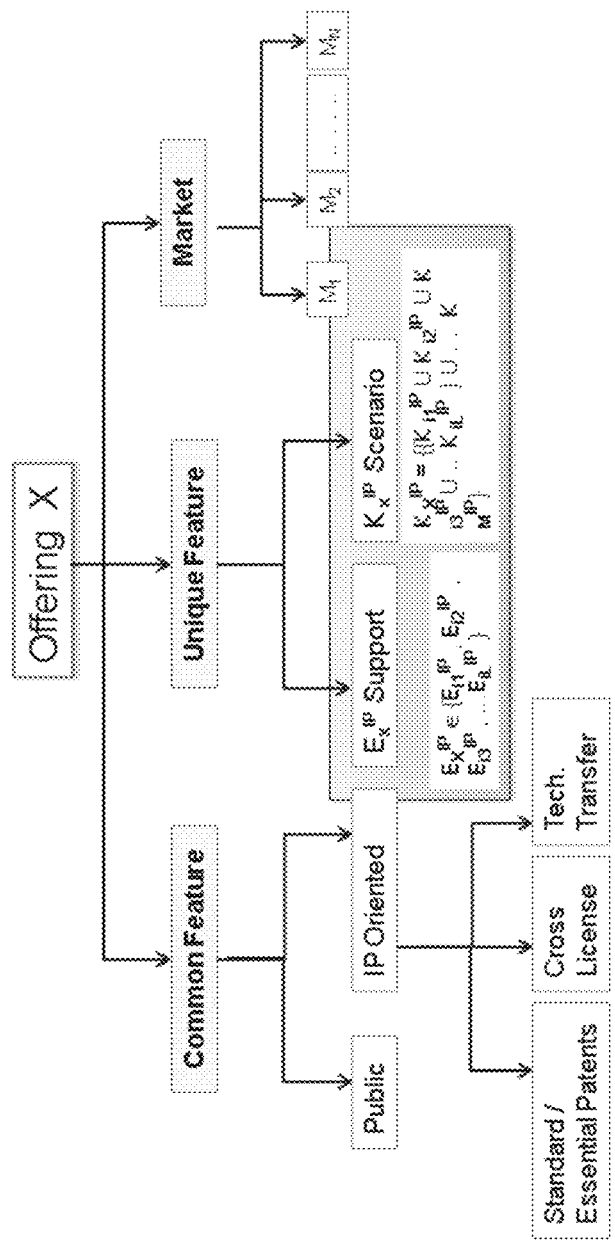
FIG. 15 depict a data categorization chart, according to an embodiment of the present subject matter.

In one implementation, the SEO module 214 may classify the IP portfolio data into three primary categories, namely Common feature related data, and unique feature related data and Market related data. FIG. 15 depict a data categorization chart, according to an embodiment of the present subject matter.

As shown in FIG. 15, the common features comprise essential features being present in a Product or offering X, which are indispensable/necessary towards building X. The legal and regulatory status of such common features can either be free to use or being active IP oriented, where IP may lie with some Standard body (essential patents) or associated IP can be considered as a possibility of Cross Licensing or Technology transfer. The unique features are the features being unique to the particular offering X and the SEO module focuses on the dataset comprising the unique feature related data.

The IP data for the unique feature dataset of X may comprise the following Enterprise and the active key players' IP data as $E_X^{IP}$ and $K_X^{IP}$ respectively, where $E_X^{IP} \in \{E_{i1}^{IP}, E_{i2}^{IP}, E_{i3}^{IP}, \ldots E_{iL}^{IP}\}$ and $K_X^{IP} = \{\{K_{i1}^{IP} \cup K_{i2}^{IP} \cup K_{i3}^{IP} \cup \ldots K_{iL}^{IP}\} \cup \ldots K_{iM}^{IP}\}$, As shown in FIG. 15, the offering X comprises unique features spanning $i_1, i_2 \ldots i_L$, for which there exists Enterprise IP. (The $E_X^{IP}$ dataset uses the symbol $\in$ (belongs to) as there may exist certain unique features which are not protected as patents yet. However, for each $E_{i1}^{IP}$ (Comparative matrix or intermediate level dataset), there exists one corresponding $K_{i1}^{IP}$ dataset (Competitive matrix, topology matrix or intermediate level dataset), therefore the $K_X^{IP}$ dataset is the aggregation of $K_{i1}^{IP}, K_{i2}^{IP}, \ldots K_{iL}^{IP}$ and is completely determined.)

However, there may exist certain unique features of X which are not IP protected by E but may have other key players' IP footprints and such unique features set may span further from $i_L$ to $i_M$.) Thus, for the $E_X^{IP}$ and $K_X^{IP}$ datasets, Strength, Spread, Duplicity and Difference have to be computed and analyzed from corresponding CIM Comparison matrix, CIM Competitive Matrix, CIM Topology Matrix and CIM Difference Matrix, which can be obtained from the sustainable IP in atomicity data of the Enterprise.

As shown in FIG. 15, in market category, as IP rights are territorial in nature and an offering's strategy is always market based, the 'Common feature' and the Unique feature' dataset will also be obtained/analyzed for a particular Market/Jurisdiction, relevant for the purpose. Also, the 'time limited' scoping of the patent rights may change the legal and regulatory status of patents tagged to unique features across different Markets/Jurisdiction.

The SEO module 214 may carry out the analysis based on the sustainable IP in atomicity and a plurality of decomposed fragments of intellectual property landscapes obtained by analyzing the sustainable IP in atomicity through data gathering and filters across time, space, and ownership.

In one of the embodiments, the feature data gathering (from the IPS module 112) may comprise a Product/offering X be having $C_i$ capabilities and $F_j$ features (i=1, N, j= 1, . . . L), wherein the Product X be planned to get commercialized in country/market M for time period Y. Based on the functionalities/means of the features, product may be tagged with their corresponding metadata under Process/Technology/Measurement/System P/T/M/S engineering domain and EA3 (Efficient/Adaptable/Agile/Anticipative) sustainable characteristic. Thereafter, cardinal weight of a feature may be determined by the SEO module 214. A feature can be linked to either a single capability (mapped as $F^f_i$, f=functional) or a set of capabilities (termed as $F^g_i$, g=integral). The cardinal weight of a feature or its significance factor is proportional to the number of capabilities with which the corresponding feature is associated with. If the feature is tagged with either P (process) or T (technology) coverage under a capability, the Cardinal weight of the feature will be the sum of the capabilities it is associated with.

Further, the SEO module 214 may identify the feature set {F} for the product {X}. The entire feature set {F} be split into two disjoint sets $\{F\}=\{\{F_k^f\}, \{F_k^g\}\}$. The suffix f stands for functional and g stands for integral. By this way, the entire feature set is divided into two disjoint sets, one comprising features which are mapped to only one capability (or the functional aspect of the capability) (denoted as $\{\{F_k^f\}\}$) and the other comprising features which are mapped to a plurality of/multiple capabilities (denoted as $\{\{F_k^g\}\}$).

Figure 16:
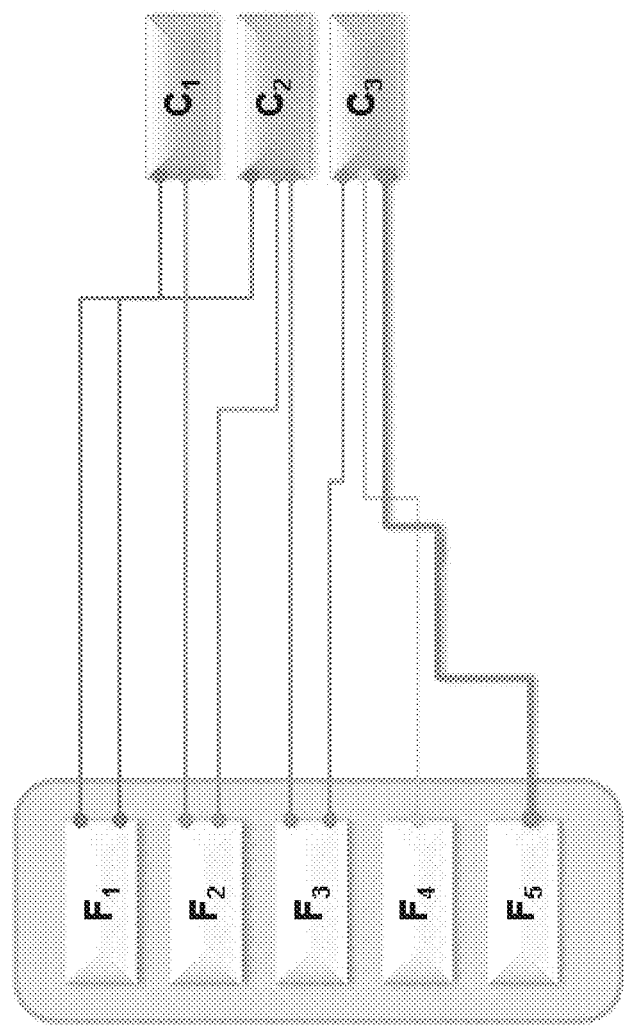
FIG. 16 represents a graphical representation of the F-C linked list, according to an embodiment of the present subject matter.

FIG. 16 represents a Graphical representation of the F-C linked list, according to an embodiment of the present subject matter. This linked list comprises the entire product data structure consisting of a group of feature nodes (the elementary datum and its metadata P/T/M/S and EA3 preferences) linked to capability nodes by pointers/links, which together represent a sequence. This structure allows for efficient insertion or removal of elements from any position in the sequence. Gather Comparison Matrix, Competitive Matrix and Difference Matrix for the corresponding features (from the grass root level SIP Model) with FTO filters.

In one implementation, the discovery module 216 may perform concept of Automation in Discovery (AD).

An Enterprise's own IP ($E^{IP}$) is always more deterministic to the Enterprise, whereas the IP data (and corresponding IP analysis) for the active key players K ($K^{IP}$) are always fuzzy, with unknown growth, merger, acquisition, sell or decay linked to their business interest. Hence, a trigger may be designed which can alert the Enterprise with a change ρ in K's landscape or in associated Portfolio. More importantly, an optimal decision maker module may be designed, which gives anticipative options to the Enterprise based on the change ρ of K's data.

The discovery module 216 may comprise sub modules comprising: (1) Unification of discovery, aggregation and presentation of the IP related data across multiple sources/repository, aggregators and producers (aggregation of aggregates), (2) Sequential (time-wise discovery) mapping and data update/versioning/tagging, (3) Legal status wise and Jurisdiction wise discovery, (4) A Comparative data analytics enabling discovery of the best IP content suitable for consumption, where and how that content can be located/acquired/obtained, supplementary information from other third party sources and social/news related data around the target (5) Behavioral targeting and funneling key players from the market trends and analytics and (6) the sub-modules may operate on a 'System Mode'. Further the automation in Discovery (AD) methodology for at least one of a key player IP related data may comprise obtaining key player IP related data based on user-defined or preconfigured discovery attribute from at least one data source, wherein the at least one data source includes assignee data, merger and acquisition data, news data, date data, jurisdiction related data, monetization data, valuation data, inventors related data, technology data, landscape data, business data, market data and standard-essential patents related data, wherein the data comprises a plurality of versions, aggregating the key player IP related data to obtain an aggregated dataset, loading at least one subset of the aggregated dataset and generating at least one of a trigger, a recommendation, an alert and a key player IP related data being discovered therein.

Figure 17:
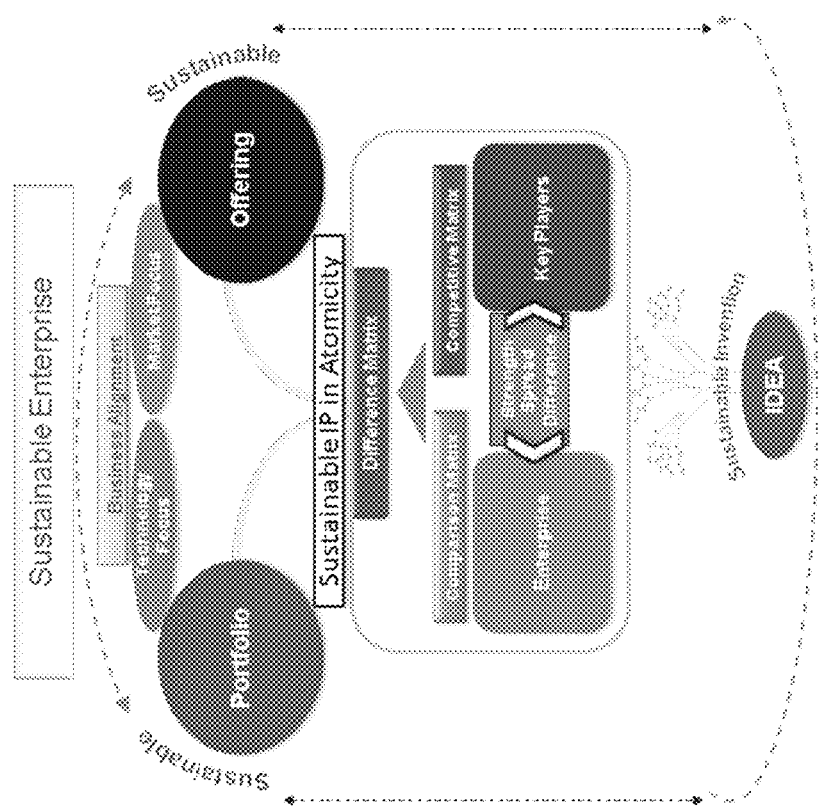
FIG. 17 illustrates a sustainable intellectual property (SIP) model, according to an embodiment of the present subject matter.

FIG. 17 illustrates a sustainable intellectual property (SIP) model, according to an embodiment of the present subject matter. The SIP model is orchestrated to ensure that any potential patent that is added to an existing patent portfolio of an Enterprise is indeed strengthening or spreading the patent portfolio to enhance the portfolio value as well as minimize the risk of litigation by taking the appropriate steps. The methodology for obtaining the sustainable IP in atomicity is automated by evolutionary Claims Parsing algorithm of Digital IP Genome set of the claims of the sustainable intellectual property in atomicity, which is designed to bifurcate in the context of Portfolio optimization and patent led offering.

Figure 18:
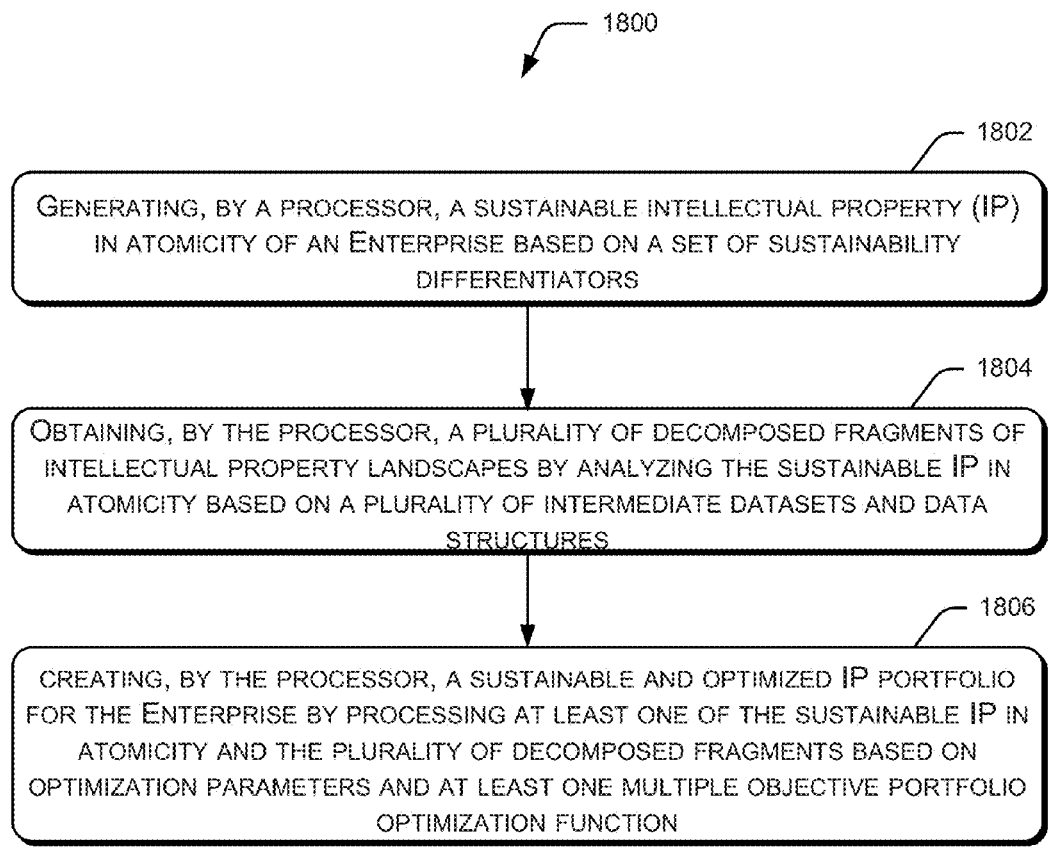
FIG. 18 illustrates is an exemplary method for managing the SIP of an Enterprise, according to an embodiment of the present subject matter.
Figure 19:
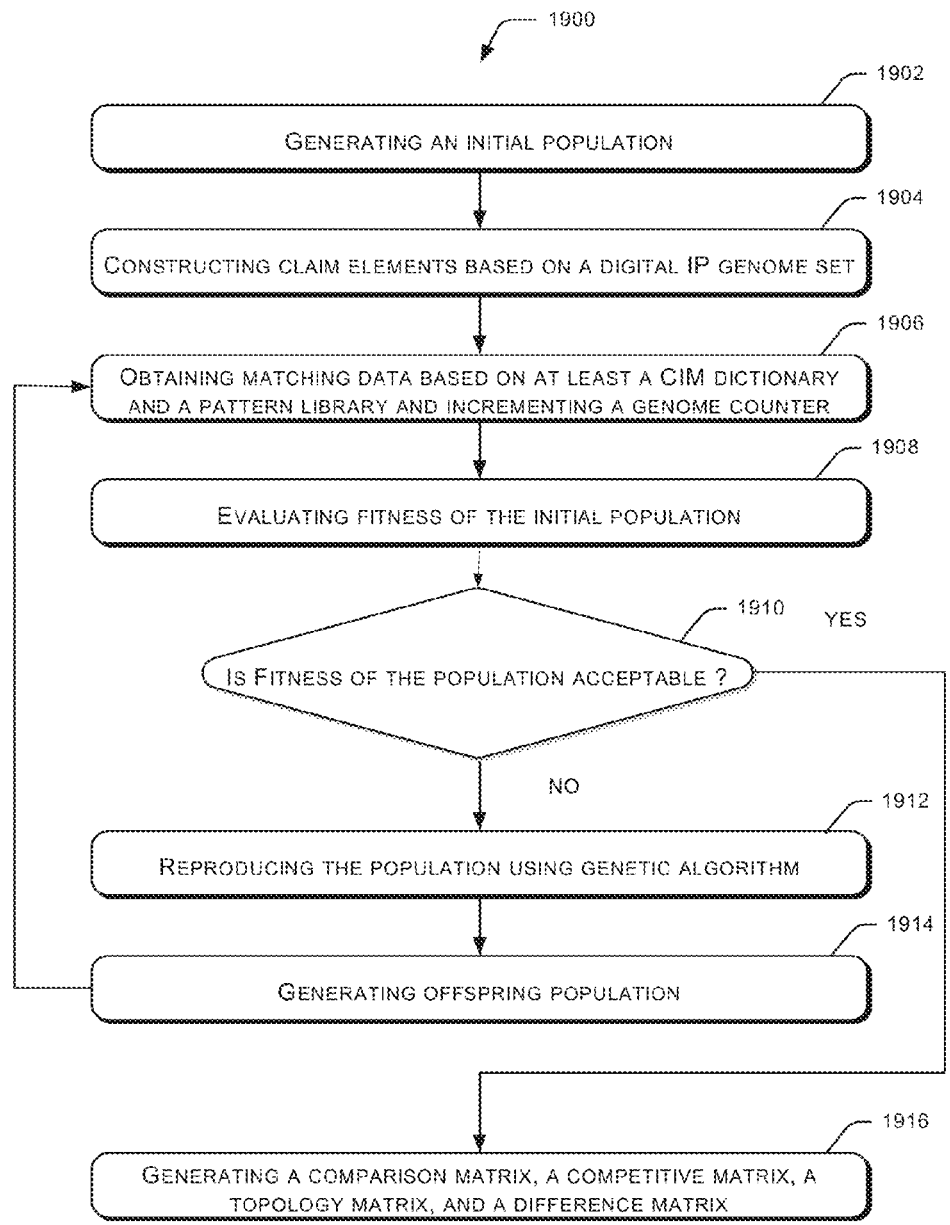
FIG. 19 illustrates is an exemplary method of claims parsing in CIM matrix by an evolutionary genetic algorithm, according to an embodiment of the present subject matter.
Figure 20:
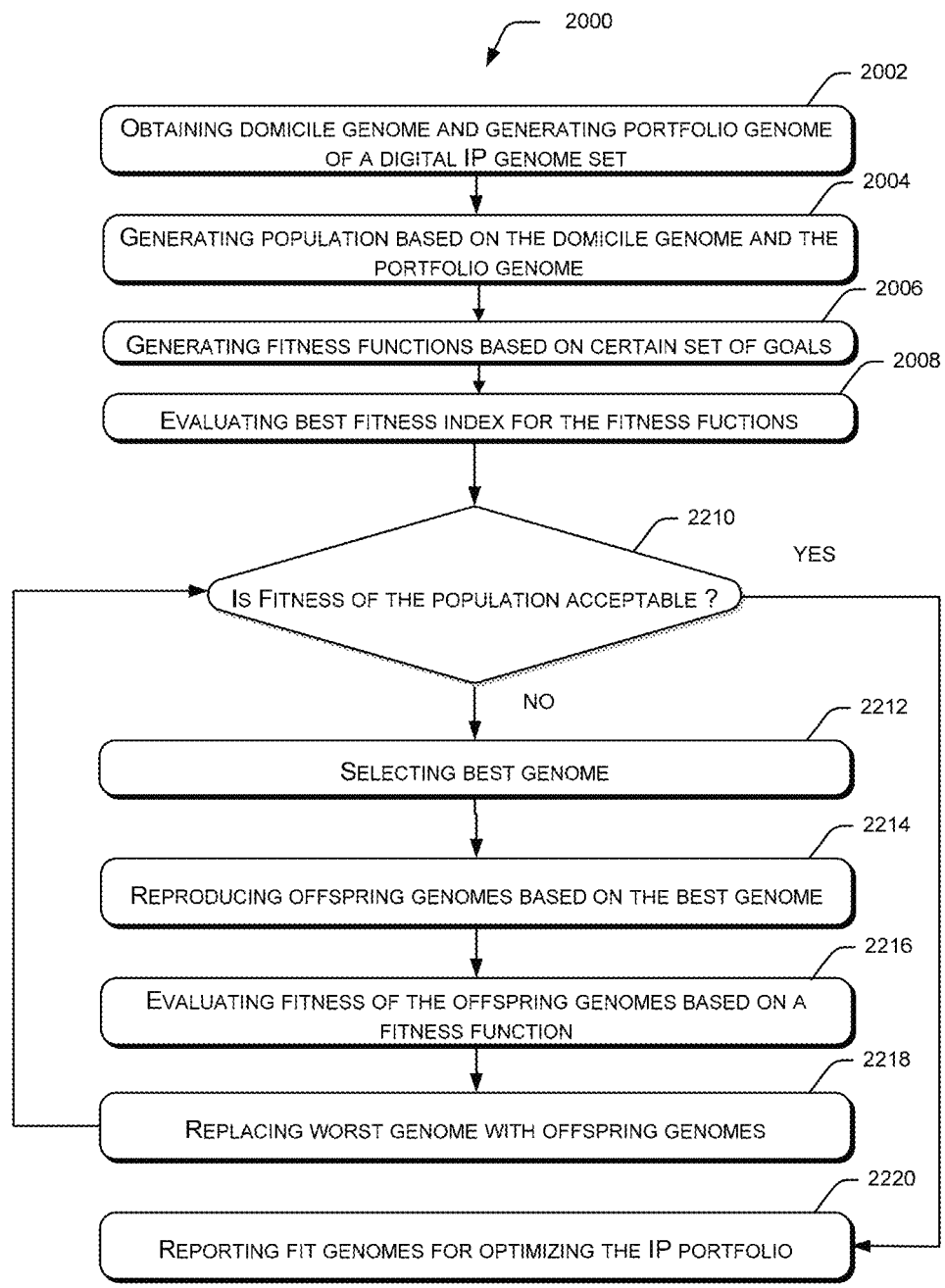
FIG. 20 illustrates is an exemplary method for creating a sustainable and optimized portfolio, according to an embodiment of the present subject matter.

FIG. 18 is an exemplary method 1800 for managing the SIP of an Enterprise, according to an embodiment of the present subject matter. FIG. 19 is an exemplary method 1900 of claims parsing in CIM matrix by an evolutionary genetic algorithm, according to an embodiment of the present subject matter. FIG. 20 is an exemplary method 2000 for creating a sustainable and optimized portfolio, according to an embodiment of the present subject matter. The methods 1800, 1900, and 2000 may be described in the general context of computer executable instructions. Generally, computer executable instructions can include routines, programs, objects, components, data structures, procedures, modules, and functions that perform particular tasks or implement particular abstract data types. The methods 1800, 1900, and 2000 may also be practiced in a distributed computing environment where functions are performed by remote processing devices that are linked through a communication network. In a distributed computing environment, computer executable instructions may be located in both local and remote computer storage media, including memory storage devices.

The order in which the methods 1800, 1900, and 2000 are described is not intended to be construed as a limitation, and any number of the described method blocks can be combined in any order to implement the methods 1800, 1900, and 2000, or alternative methods. Additionally, individual blocks may be deleted from the methods 1800, 1900, and 2000 without departing from the spirit and scope of the subject matter described herein. Furthermore, the methods 1800, 1900, and 2000 can be implemented in any suitable hardware, software, firmware, or combination thereof.

With reference to block 1802 of method 1800 as depicted in FIG. 18, a sustainable intellectual property (IP) in atomicity of the Enterprise is generated based on a set of sustainability differentiators. The set of sustainability differentiator may be obtained based on at least one of a strength parameter, a spread parameter, a duplicity parameter, and a difference parameter. In one implementation, the set of sustainability differentiators may be obtained by defining at least one of a sustainable claims set and a competitive advantageous claims set for a sustainable intellectual property (IP) of the Enterprise.

For defining the sustainable claims set and the competitive advantageous claims set, a strength parameter and a spread parameter for claim elements of the atomic intellectual property are defined to obtain the set of sustainability differentiators. In one implementation, the sustainable claims set may be defined by analyzing the IP in atomicity in comparison with at least one of a pre-existing and a newly formed intellectual property portfolio of the Enterprise ($E^{IP}$). In one implementation, the competitive advantageous claims set may be defined by analyzing the IP in atomicity in comparison with at least one of a key player IP ($K^{IP}$). Thereafter, a Comparison Matrix for the atomic intellectual property is created by aggregating the existing intellectual property claims elements dataset of the Enterprise in a pre-configured time sequential manner. Similarly, a Competitive Matrix and a Topology Matrix for the atomic intellectual property may be created by aggregating the existing intellectual property claims elements dataset of at least one key player in the pre-configured time sequential manner, respectively. After creating the comparison matrix and the competitive matrix, a strength cardinality, a spread cardinality, and duplicity in strength and spread of claims elements, a Boolean Matrix of the Comparison Matrix, and at least one of the Competitive Matrix and the Topology Matrix are created. Subsequently, the sustainable claims set are generated by comparing the strength cardinality, the spread cardinality, and a Boolean Matrix dataset of the atomic intellectual property with respect to a dataset of the Comparison Matrix. Similarly, the competitive advantageous claims set is obtained by comparing the atomic intellectual property dataset with at least one of the Competitive Matrix or Topology Matrix dataset, wherein the comparing comprises the generating of at least one of a clean set claim element, a strong difference claim element, a distributed difference claim element and a fuzzy difference claim element.

At block 1804, a plurality of decomposed fragments of intellectual property landscapes are obtained by analyzing sustainable IP in atomicity based on a plurality of intermediate datasets and data structures. In one implementation, the landscape analytics module 114 may create a new set of data structures, a variety of stratification rules and mapping algorithm for sharpening the scope of IP portfolio optimization. The new set of data structures offer scalability and optimization from IP Sustainability level to a large-scale optimized IP portfolio by computing and displaying a number of intermediate Data sets. Such data sets can be viewed as decomposed fragments or partial visualization of the IP landscape and may depict one or patterns and trends related to the IP portfolio.

At block 1806, a sustainable and optimized IP portfolio for the Enterprise is created by processing at least one of the sustainable IP in atomicity and the plurality of decomposed fragments based on optimization parameters and at least one multiple objective portfolio optimization function. The sustainable and optimized IP portfolio may be based on a plurality of decomposed fragments of intellectual property landscapes obtained by analyzing the sustainable IP in atomicity. For creating the sustainable and optimized IP portfolio, data from at least one of the sustainable IP in atomicity and the plurality of decomposed fragments of the intellectual property landscapes is gathered. Subsequently, the data may be parameterized using one or more optimization parameters for the purpose of optimization. The optimization parameters comprise at least one of a synergy and growth parameter, a valuation parameter, and a risk parameter. Thereafter, at least one multiple objective portfolio optimization function may be executed for obtaining the sustainable and optimized IP portfolio. Based on execution of the multiple objective portfolio optimization function, scenario based positioning of the sustainable and optimized portfolio is identified.

Further, the sustainable IP led offering may be created based on the Enterprise's IP ($E^{IP}$) support data and at least one of a key player's IP ($K^{IP}$) scenario data obtained from the sustainable IP in atomicity. For obtaining the he Enterprise's IP ($E^{IP}$) support data and at least one of a key player's IP ($K^{IP}$) scenario data, a unique feature for the offering is defined and then a unique-feature capability linked list related to at least one of the unique features of the offering is generated. Thereafter, the Enterprise's IP ($E^{IP}$) support data and at least one of a key players' IP ($K^{IP}$) scenario data is generated based on at least one of the Comparison matrix, the Competitive matrix, the Topology Matrix and the Difference Matrix.

With reference to method 1900 as depicted in FIG. 19, as shown in block 1902, an initial population for Digital IP genome set for claims set of a new patent or patent application is obtained. The initial population for the Digital IP genome set is obtained by aggregating a Digital IP genome for each claim element in the claims of the patent. At block 1904, claims are read and claim elements are constructed based on the Digital IP genome set. At block 1906, matching data is obtained based on at least one of a CIM dictionary and a pattern library and, subsequently, a genome counter is incremented. The claims statements are matched with words of the CIM dictionary and the matched data is obtained. Based on the matched data a cell of a CIM matrix is filled. Once the claims element occupies the cell of the CIM matrix, the genome counter is incremented so that other elements can also occupy a cell in the CIM matrix. At block 1908, fitness of the initial population is evaluated. In one implementation, the fitness of the initial population may be evaluated based on a ranking algorithm. At block 1910, if the fitness of the claims element is below a threshold level, the method 1900 branches to the block 1912. If the fitness of the claims element is above the threshold level, the method 1900 branches to block 1916. At block 1912, population of the claims element is reproduced by using a genetic algorithm. At block 1914, evolutionary Digital genome set is obtained based on the population generated at block 1912. Thereafter, the method 1900 branches to block 1906. At block 1916, a comparison matrix, a competitive matrix, and a difference matrix are obtained for the claims elements having fitness above the threshold level.

With reference to method 2000 as depicted in FIG. 20, as shown in block 2002, a domicile is obtained and a portfolio genome is generated for a Digital IP genome set. At block 2004, population of claims element is generated based on the domicile genome and the portfolio genome. At block 2006, fitness functions based on a select set of goals are generated. The certain set of goal are already described in Table 1. At block 2008, best fitness index for the fitness function is evaluated. At block 2210, fitness of the population is determined. If the fitness of the population is above a threshold level, the method 2000 branches to block 2220. If the fitness of the population is below the threshold level, the method 2000 branches to block 2212. At block 2212, best genome is selected from the Digital IP genome set. At block 2214, offspring genomes are reproduced based on the best genome. At block 2216, fitness of the offspring genomes is evaluated based on a fitness function. At block 2218, worst genomes are replaced with the offspring genomes. Thereafter, the method branches to block 2210 for checking the fitness of the offspring genomes. At block 2220, a fit genome is reported for optimizing the IP portfolio. The fit genome is the genome having fitness above the threshold level.

Thus the SIP management system 102 facilitates generation of the sustainable IP in atomicity and optimization of IP portfolio of the Enterprise. The systems and method for managing sustainable intellectual property portfolio as described in the present subject matter are generic and platform independent and thus can be used for various types of systems. Although embodiments for the managing the sustainable intellectual property portfolio have been described in language specific to structural features and/or methods, it is to be understood that the present subject matter is not necessarily limited to the specific features or methods described. Rather, the specific features and methods are disclosed as exemplary implementations for managing the sustainable intellectual property portfolio of the Enterprise.

We claim:

1. A computer-implemented method for managing a sustainable intellectual property (SIP) portfolio of an Enterprise, the computer-implemented method comprises:
   generating, by a processor, a sustainable intellectual property (IP) in atomicity of the Enterprise based on a set of sustainability differentiators, wherein the set of sustainability differentiators is obtained, based on at least one of a strength parameter, a spread parameter, a duplicity parameter, and a difference parameter;
   defining a sustainable claims set by analyzing the IP in atomicity in comparison with at least one of a pre-existing and a newly formed intellectual property portfolio of the Enterprise (EIP), the analysis comprising:
      defining, by the processor, a strength parameter and a spread parameter for claim elements of an intellectual property in atomicity;
      creating, by the processor, a Comparison Matrix for the intellectual property by aggregating existing intellectual property claims elements dataset of the Enterprise in a preconfigured time sequential manner;
      creating, by the processor, at least one of a Competitive Matrix and a Topology Matrix for the intellectual property by aggregating existing intellectual property claims elements dataset of at least one key player in the pre-configured time sequential manner respectively;
      generating, by the processor, a strength cardinality, a spread cardinality, and duplicity in strength and spread of claims elements, a Boolean Matrix of the Comparison Matrix, and at least one of the Competitive Matrix and the Topology Matrix of the sustainable IP in atomicity;
      generating, by the processor, the sustainable claims set by comparing the strength cardinality, the spread cardinality, and a Boolean Matrix dataset of the intellectual property in atomicity with respect to a dataset of the Comparison Matrix;
   defining a competitive advantageous claims set by analyzing the IP in atomicity in comparison with at least one of a key player IP (KIP) by comparing the intellectual property dataset in atomicity with at least one of a dataset of the Competitive Matrix or the Topology Matrix, wherein the comparing comprises generating a dataset by determining a clean set claim element data, a strong difference claim element data, a distributed difference claim element data and a fuzzy difference claim element data, wherein the dataset is generated by obtaining at least a Difference Matrix comprising the intellectual property in atomicity dataset in comparison with at least one of the Competitive matrix dataset and the Topology Matrix dataset;
   obtaining, by the processor, a plurality of decomposed fragments of intellectual property landscapes by analyzing the sustainable IP in atomicity based on a plurality of intermediate datasets and data structures;
   creating, by the processor, a sustainable and optimized IP portfolio for the Enterprise by processing at least one of the sustainable IP in atomicity and the plurality of decomposed fragments based on optimization parameters and at least one multiple objective portfolio optimization function, and wherein the optimization parameters includes a synergy and growth parameter, a valuation parameter, and a risk parameter;
   creating a Digital IP Genome set for each claim element of each claim of the IP in atomicity, wherein the Digital IP Genome set comprises:
      Domicile Genome data including at least one of a date entry, a jurisdiction entry, an assignee entry, an inventors entry, and an intellectual property classification entry;
      Claims Elements Index data comprising attributes related to at least one of claim data (numeric or alphanumeric) (Cl) as appearing in the intellectual property document, independent claim element data (Ind), first order dependent claim element data (FOD), linked first order dependent claim element data (LFOD), second order dependent claim element data (SOD), a linked second order dependent claim element data (LSOD) and a claim element data (Cl_EL); and
      CIM Genome data comprising an 11-digit binary string based on N-I-U-P-T-M-S-EfiAdp-Agl-Ant bit, wherein the N-I-U-P-T-M-S-Efi-Adp-Agl-Ant determine the Category (NIU), the Coverage Area (PTMS) and the Sustenance Characteristic (EA3) dimensions of a CIM matrix, for mapping the claim elements to a cell of CIM matrix, which in turn maps to other related matrices;
   creating a collaborative invention mining (CIM) matrix by allocating claim elements from the CIM Genome Data to cells of the CIM matrix, wherein the CIM matrix three-dimensionally maps the Novelty (N), Inventive (I), and Utility (U) Category; Process (P), Technology (T), Measurement (M), System (S) Area; and EA3 (Efficient, Agile, Adaptable, Anticipative) Characteristic dimensions;

wherein the creating of the CIM Genome of the Digital IP Genome further comprises:
  creating, by the processor, an initial population of the Digital IP Genome set by aggregating a Digital IP genome for each claim element in the claims of the IP;
  parsing, by the processor, the claims elements;
  matching, by the processor, the claim elements of the IP to the same word, synonym, or word pattern in a CIM dictionary, wherein the CIM dictionary includes a list of words, patterns, and associated NIU, PTMS, and EA3 classifications;
  evaluating, by the processor, fitness of the initial population using scoring logic based on percentage of matching words or metadata from the matching, wherein if the percentage is below a predetermined threshold, removing the claim elements below a predetermined threshold;
  iteratively generating, by the processor, an offspring Digital IP Genome Set after removing the claim elements below a predetermined threshold to arrive at a fit CIM Genome when the matching is above the predetermined threshold; and
  determining, by the processor, the strength and the spread and the duplicity in strength and spread of the CIM Genome data upon identifying a fit CIM genome.

2. The computer-implemented method as claimed in claim 1, wherein the defining further comprises:
  determining, by the processor, a deepening capability of claimable subject matter of a claim element;
  determining, by the processor, a widening capability of the claimable subject matter of a claim element; and
  tagging, by the processor, the deepening capability with strength parameter and tagging the widening capability with spread parameter.

3. The computer-implemented method as claimed in claim 1, wherein the creating of at least one of the Comparison Matrix, the Competitive Matrix, the Topology Matrix, the Difference Matrix and a CIM Matrix further comprises:
  obtaining, by the processor, domicile data from bibliographic data of an atomic intellectual property, wherein the domicile data comprises at least one of a date data, a jurisdiction data, an assignee data, inventor(s) data and at least one of intellectual property classification data;
  generating, by the processor, a claims elements index (CEI) from claims elements tree for claims of the sustainable IP in atomicity; and
  creating, by the processor, a Digital IP Genome set for each claim element of each claim of the IP in atomicity, wherein the Digital IP genome set includes at least the domicile data, the claims element index data and a collaborative invention mining (CIM) genome data, wherein the CIM Genome data allocate a claim element to a particular cell of the respective CIM Matrix.

4. The computer-implemented method as claimed in claim 1, wherein the creating of the sustainable and optimized IP portfolio further comprises:
  gathering, by the processor, data from at least one of the sustainable IP in atomicity and the plurality of decomposed fragments of the intellectual property landscapes, wherein the data is further being parameterized using one or more optimization parameters for optimization, wherein the optimization parameters comprise at least one of a synergy and growth parameter, a valuation parameter, and a risk parameter;
  executing, by the processor, at least one multiple objective portfolio optimization function for obtaining the sustainable and optimized IP portfolio; and
  identifying, by the processor, scenario based positioning of the optimized portfolio obtained therein.

5. The computer-implemented method as claimed in claim 1, wherein at least one of the generating of the sustainable intellectual property in atomicity and the creating a sustainable and optimized IP portfolio for the enterprise further comprises an Automation in Discovery (AD) methodology for at least one of a key player IP related data, wherein the AD methodology comprising:
  obtaining, by the processor, key player IP related data, based on a preconfigured discovery attribute, from at least one data source, wherein the at least one data source includes data elements comprising assignee data, merger and acquisition data, news data, date data, jurisdiction related data, monetization data, valuation data, inventors related data, technology data, landscape data, business data, market data and standard-essential patents related data, wherein the data comprises a plurality of versions;
  aggregating, by the processor, the key player IP related data to obtain an aggregated dataset;
  loading, by the processor, at least one subset of the aggregated dataset; and
  generating, by the processor, at least one of a trigger, a recommendation, and an alert based on key player IP related data being discovered therein.

6. The computer-implemented method as claimed in claim 1, wherein the sustainable IP in atomicity data of the Enterprise further creates data for sustainable IP led offering of the Enterprise, comprising
  defining, by the processor, a unique feature for the offering and generating a unique-feature capability (FC) linked list related to at least one of the unique features of the offering; and
  generating, by the processor, an Enterprise's IP ($E^{IP}$) support data and at least one of a key players' IP ($K^{IP}$) scenario data for the unique feature based on at least one of the Comparison matrix, the Competitive matrix, the Topology Matrix, the Difference Matrix and a filter option, wherein the filter option comprises at least one of a date filter, a jurisdiction filter and an ownership filter.

7. An intellectual property portfolio management system for managing a sustainable intellectual property (SIP) of an Enterprise, intellectual property portfolio management system comprises:
  a processor configured to perform the steps of:
  generating a sustainable intellectual property (IP) in atomicity of the Enterprise based on a set of sustainability differentiators, wherein the set of sustainability differentiators is obtained, based on at least one of a strength parameter, a spread parameter, a duplicity parameter, and a difference parameter;
  defining a sustainable claims set by analyzing the IP in atomicity in comparison with at least one of a pre-existing and a newly formed intellectual property portfolio of the Enterprise (EIP), the analysis comprising:

defining a strength parameter and a spread parameter for claim elements of an intellectual property in atomicity;

creating a Comparison Matrix for the intellectual property by aggregating existing intellectual property claims elements dataset of the Enterprise in a pre-configured time sequential manner;

creating at least one of a Competitive Matrix and a Topology Matrix for the intellectual property by aggregating existing intellectual property claims elements dataset of at least one key player in the pre-configured time sequential manner respectively;

generating a strength cardinality, a spread cardinality, and duplicity in strength and spread of claims elements, a Boolean Matrix of the Comparison Matrix, and at least one of the Competitive Matrix and the Topology Matrix of the sustainable IP in atomicity;

generating the sustainable claims set by comparing the strength cardinality, the spread cardinality, and a Boolean Matrix dataset of the intellectual property in atomicity with respect to a dataset of the Comparison Matrix;

defining a competitive advantageous claims set by analyzing the IP in atomicity in comparison with at least one of a key player IP (KIP) by comparing the intellectual property dataset in atomicity with at least one of a dataset of the Competitive Matrix or the Topology Matrix, wherein the comparing comprises generating a dataset by determining a clean set claim element data, a strong difference claim element data, a distributed difference claim element data and a fuzzy difference claim element data, wherein the dataset is generated by obtaining at least a Difference Matrix comprising the intellectual property in atomicity dataset in comparison with at least one of the Competitive matrix dataset and the Topology Matrix dataset;

obtaining a plurality of decomposed fragments of intellectual property landscapes by analyzing the sustainable IP in atomicity based on a plurality of intermediate datasets and data structures;

creating a sustainable and optimized IP portfolio for the Enterprise by processing at least one of the sustainable IP in atomicity and the plurality of decomposed fragments based on optimization parameters and at least one multiple objective portfolio optimization function, and wherein the optimization parameters includes a synergy and growth parameter, a valuation parameter, and a risk parameter;

creating a Digital IP Genome set for each claim element of each claim of the IP in atomicity, wherein the Digital IP Genome set comprises:

Domicile Genome data including at least one of a date entry, a jurisdiction entry, an assignee entry, an inventors entry, and an intellectual property classification entry;

Claims Elements Index data comprising attributes related to at least one of claim data (numeric or alphanumeric) (Cl) as appearing in the intellectual property document, independent claim element data (Ind), first order dependent claim element data (FOD), linked first order dependent claim element data (LFOD), second order dependent claim element data (SOD), a linked second order dependent claim element data (LSOD) and a claim element data (Cl_EL); and CIM Genome data comprising an 11-digit binary string based on N-I-U-P-T-M-S-EfiAdp-Agl-Ant bit, wherein the N-I-U-P-T-M-S-Efi-Adp-Agl-Ant determine the Category (NIU), the Coverage Area (PTMS) and the Sustenance Characteristic (EA3) dimensions of a CIM matrix, for mapping the claim elements to a cell of CIM matrix, which in turn maps to other related matrices;

creating a collaborative invention mining (CIM) matrix by allocating claim elements from the CIM Genome Data to cells of the CIM matrix, wherein the CIM matrix three-dimensionally maps the Novelty (N), Inventive (I), and Utility (U) Category; Process (P), Technology (T), Measurement (M), System (S) Area; and EA3 (Efficient, Agile, Adaptable, Anticipative) Characteristic dimensions;

wherein the creating of the CIM Genome of the Digital IP Genome further comprises:

creating an initial population of the Digital IP Genome set by aggregating a Digital IP genome for each claim element in the claims of the IP;

parsing the claims elements;

matching the claim elements of the IP to the same word, synonym, or word pattern in a CIM dictionary, wherein the CIM dictionary includes a list of words, patterns, and associated NIU, PTMS, and EA3 classifications;

evaluating fitness of the initial population using scoring logic based on percentage of matching words or metadata from the matching, wherein if the percentage is below a predetermined threshold, removing the claim elements below a predetermined threshold;

iteratively generating an offspring Digital IP Genome Set after removing the claim elements below a predetermined threshold to arrive at a fit CIM Genome when the matching is above the predetermined threshold; and determining the strength and the spread and the duplicity in strength and spread of the CIM Genome data upon identifying a fit CIM genome.

8. The intellectual property portfolio management system as claimed in claim 7, wherein the sustainable claims set of the intellectual property in atomicity includes:

the strength cardinality and the spread cardinality of the claims elements of the intellectual property in comparison with an Enterprise's previous intellectual property dataset, wherein the comparison is based on the Comparison Matrix; and a density enhancer data and a pushing frontier data for both the strength and the spread cardinality, wherein the density enhancer data and the pushing frontier data are proportional to a Boolean difference of claim elements in the claims of the intellectual property in atomicity in comparison with that of the Comparison Matrix.

9. The intellectual property portfolio management system as claimed in claim 7, further comprising at least one of:

a Patent Map generation module configured to generate a plurality of maps, wherein the plurality of maps includes at least one of an Internal Patent Map, a Synergy Patent Map, a Conjugate Patent Map, a Jurisdiction Patent Map and a Key player Dominance Map based on at least one of Comparison Matrix, Competitive matrix, Topology Matrix, and Difference Matrix; and an Indicative Trend Analytics Module configured to generate at least one of a time dependent map of one of a plurality of maps.

10. The intellectual property portfolio management system as claimed in claim 7, wherein the processor is further configured to:

gather at least one of the sustainable IP in atomicity and the plurality of decomposed fragments of the intellectual property landscapes;

determine at least one of synergy data, growth data, and strategic alignment data based on the sustainable IP in atomicity and the plurality of decomposed fragments;

determine valuation of the sustainable IP in atomicity and the plurality of decomposed fragments;

determine at least one of a legal risk and a valuation risk of the sustainable IP in atomicity and the plurality of decomposed fragments;

execute at least one multiple objective portfolio optimization function on the sustainable IP in atomicity and the plurality of decomposed fragments thereby generating an optimized and sustainable intellectual property portfolio; and position the optimized and sustainable intellectual property portfolio based on a scenario, wherein the scenario includes at least one of promoting, flooding, fencing, strengthening, surrounding, and patent networking strategies.

11. The intellectual property portfolio management system as claimed in claim 7, wherein the processor is further configured to:

provide data set to a Sustainable Enterprise Offering Module (SEO), wherein the SEO Module is configured to generate a filtered set of IP and dataset related to an Enterprise's offering by analyzing the said offering's unique features related IP dataset, wherein the filtering comprises at least one of a date filter, jurisdiction filter, and an ownership filter.

12. The intellectual property portfolio management system as claimed in claim 7, wherein the processor is further configured to:

receive alphanumeric data comprising at least one of a key player's intellectual property related discovery attribute set comprising assignee data, merger and acquisition data, news data, date data, jurisdiction related data, monetization data, valuation data, inventors related data, technology data, landscape data, business data, market data and standard-essential patents related data, wherein the alphanumeric data includes a plurality of versions;

extract the alphanumeric data from a data repository; and generate at least one of a trigger, a recommendation, and an alert based on key player IP related data being discovered therein.

13. A non-transitory computer-readable medium having embodied thereon a computer program for executing a method comprising:

generating, by a processor, a sustainable intellectual property (IP) in atomicity of the Enterprise based on a set of sustainability differentiators, wherein the set of sustainability differentiators is obtained, based on at least one of a strength parameter, a spread parameter, a duplicity parameter, and a difference parameter;

defining a sustainable claims set by analyzing the IP in atomicity in comparison with at least one of a pre-existing and a newly formed intellectual property portfolio of the Enterprise (EIP), the analysis comprising:

defining, by the processor, a strength parameter and a spread parameter for claim elements of an intellectual property in atomicity;

creating, by the processor, a Comparison Matrix for the intellectual property by aggregating existing intellectual property claims elements dataset of the Enterprise in a preconfigured time sequential manner;

creating, by the processor, at least one of a Competitive Matrix and a Topology Matrix for the intellectual property by aggregating existing intellectual property claims elements dataset of at least one key player in the pre-configured time sequential manner respectively;

generating, by the processor, a strength cardinality, a spread cardinality, and duplicity in strength and spread of claims elements, a Boolean Matrix of the Comparison Matrix, and at least one of the Competitive Matrix and the Topology Matrix of the sustainable IP in atomicity;

generating, by the processor, the sustainable claims set by comparing the strength cardinality, the spread cardinality, and a Boolean Matrix dataset of the intellectual property in atomicity with respect to a dataset of the Comparison Matrix;

defining a competitive advantageous claims set by analyzing the IP in atomicity in comparison with at least one of a key player IP (KIP) by comparing the intellectual property dataset in atomicity with at least one of a dataset of the Competitive Matrix or the Topology Matrix, wherein the comparing comprises generating a dataset by determining a clean set claim element data, a strong difference claim element data, a distributed difference claim element data and a fuzzy difference claim element data, wherein the dataset is generated by obtaining at least a Difference Matrix comprising the intellectual property in atomicity dataset in comparison with at least one of the Competitive matrix dataset and the Topology Matrix dataset;

obtaining, by the processor, a plurality of decomposed fragments of intellectual property landscapes by analyzing the sustainable IP in atomicity based on a plurality of intermediate datasets and data structures;

creating, by the processor, a sustainable and optimized IP portfolio for the Enterprise by processing at least one of the sustainable IP in atomicity and the plurality of decomposed fragments based on optimization parameters and at least one multiple objective portfolio optimization function, and wherein the optimization parameters includes a synergy and growth parameter, a valuation parameter, and a risk parameter;

creating a Digital IP Genome set for each claim element of each claim of the IP in atomicity, wherein the Digital IP Genome set comprises:

Domicile Genome data including at least one of a date entry, a jurisdiction entry, an assignee entry, an inventors entry, and an intellectual property classification entry;

Claims Elements Index data comprising attributes related to at least one of claim data (numeric or alphanumeric) (Cl) as appearing in the intellectual property document, independent claim element data (Ind), first order dependent claim element data (FOD), linked first order dependent claim element data (LFOD), second order dependent claim element data (SOD), a linked second order dependent claim element data (LSOD) and a claim element data (Cl_EL); and CIM Genome data comprising an 11-digit binary string based on N-I-U-P-T-M-S-EfiAdp-Agl-Ant bit, wherein the N-I-U-P-T-M-S-Efi-Adp-Agl-Ant determine the Category (NIU), the Coverage Area (PTMS) and the Sustenance Characteristic (EA3)

dimensions of a CIM matrix, for mapping the claim elements to a cell of CIM matrix, which in turn maps to other related matrices;

creating a collaborative invention mining (CIM) matrix by allocating claim elements from the CIM Genome Data to cells of the CIM matrix, wherein the CIM matrix three-dimensionally maps the Novelty (N), Inventive (I), and Utility (U) Category; Process (P), Technology (T), Measurement (M), System (S) Area; and EA3 (Efficient, Agile, Adaptable, Anticipative) Characteristic dimensions;

wherein the creating of the CIM Genome of the Digital IP Genome further comprises:

creating, by the processor, an initial population of the Digital IP Genome set by aggregating a Digital IP genome for each claim element in the claims of the IP;

parsing, by the processor, the claims elements;

matching, by the processor, the claim elements of the IP to the same word, synonym, or word pattern in a CIM dictionary, wherein the CIM dictionary includes a list of words, patterns, and associated NIU, PTMS, and EA3 classifications;

evaluating, by the processor, fitness of the initial population using scoring logic based on percentage of matching words or metadata from the matching, wherein if the percentage is below a predetermined threshold, removing the claim elements below a predetermined threshold;

iteratively generating, by the processor, an offspring Digital IP Genome Set after removing the claim elements below a predetermined threshold to arrive at a fit CIM Genome when the matching is above the predetermined threshold; and determining, by the processor, the strength and the spread and the duplicity in strength and spread of the CIM Genome data upon identifying a fit CIM genome.

* * * * *